United States Patent [19]

Mitani et al.

[11] Patent Number: 5,214,125
[45] Date of Patent: May 25, 1993

[54] POLYAMIDE FROM 3,5-TRICYCLO[5.2.1.0²·⁶]DECANE DICARBOXYLIC ACID

[75] Inventors: Makoto Mitani, Yamaguchi; Toshimasa Takata, Iwakuni, both of Japan

[73] Assignee: Mitsui Petrochemical Industries, Ltd., Tokyo, Japan

[21] Appl. No.: 762,333

[22] Filed: Sep. 19, 1991

[30] Foreign Application Priority Data

Sep. 19, 1990 [JP] Japan .................. 2-249282
Dec. 28, 1990 [JP] Japan .................. 2-408937
Dec. 28, 1990 [JP] Japan .................. 2-408938

[51] Int. Cl.⁵ ............................................ C08G 69/26
[52] U.S. Cl. .................. 528/344; 528/125; 528/183; 528/190; 528/337; 528/338; 528/339; 528/340
[58] Field of Search ............ 528/344, 125, 183, 190, 528/338, 339, 340, 337

[56] References Cited

U.S. PATENT DOCUMENTS 2,937,162  5/1960  Martin et al. ................ 528/344

FOREIGN PATENT DOCUMENTS 0065720  4/1983  Japan ....................... 528/344

*Primary Examiner*—Harold D. Anderson
*Attorney, Agent, or Firm*—Sherman and Shalloway

[57] ABSTRACT

A polyamide comprising a recurring unit of the formula (I),

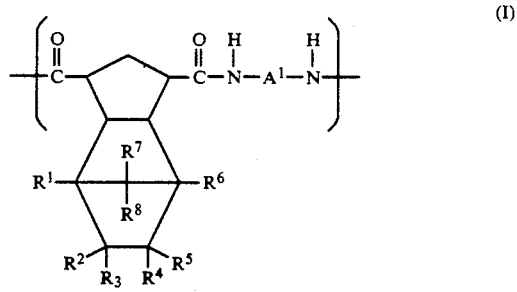

wherein each of $R^1$, $R^2$, $R^3$, $R^4$, $R^5$, $R^6$, $R^7$ and $R^8$ is independently a hydrogen atom, a halogen atom, a hydroxyl group, or a group of a carbon skeleton which may contain a hetero atom or a halogen atom, and $A^1$ is a divalent hydrocarbon group; and a process for the production of a polyamide comprising the recurring unit of the formula (I), which comprises subjecting to a polycondensation reaction a dicarboxylic acid comprising an alicyclic dicarboxylic acid of the formula (a)-1,

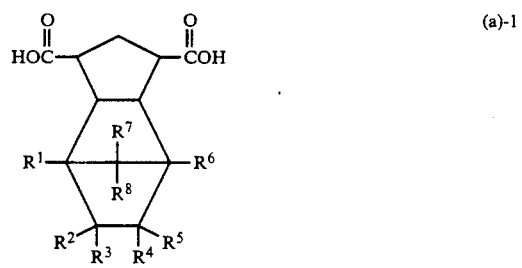

wherein $R^1$, $R^2$, $R^3$, $R^4$, $R^5$, $R^6$, $R^7$ and $R^8$ are as defined in the formula (I), and a diamine of the formula (b)-1,

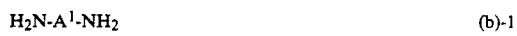

wherein $A^1$ is as defined in the formula (I).

45 Claims, 4 Drawing Sheets

POLYAMIDE FROM 3,5-TRICYCLO[5.2.1.0²·⁶]DECANE DICARBOXYLIC ACID

DETAILED DESCRIPTION OF THE INVENTION

The present invention relates to a novel polyamide and a process for the production thereof. More specifically, it relates to a novel polyamide having excellent transparency and heat resistance and a process for the production thereof.

It is known that polyamides are excellent in toughness, heat resistance, self-lubricity, vibration absorption properties and oil resistance, and also excellent in processability. Examples of such polyamides include aliphatic polyamides such as nylon 6, nylon 66, nylon 610, nylon 12, etc., poly(p-phenyleneterephthalamide), an aromatic polyamide obtained from terephthalic acid and hexamethylenediamine, and the like. These polyamides are generally crystalline.

Such crystalline polyamides are widely used for engineering plastics, fibers, etc., owing to the above excellent properties. However, the above crystalline polyamides have problems in that they have inferior transparency and hardly show dimensional stability as a molded article due to their high mold shrinkage factor and high water absorption properties.

Studies of a variety of noncrystalline polyamides which are to have excellent transparency are under way in order to overcome the above problems.

Japanese Patent Publication No. 21115/1974 discloses a polyamide obtained from terephthalic acid as an acid component and 2,2,4- and 2,4,4-trimethylhexamethylenediamines as a diamine component.

Japanese Laid-Open Patent Publication No. 65720/1983 discloses a thermoplastic polyamide resin having the recurring unit of the following formula (A),

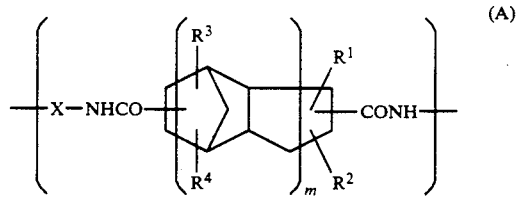

(A)

wherein X is a residue of an aliphatic, alicyclic or aromatic diamine from which an amino group is removed, each of $R^1$, $R^2$, $R^3$ and $R^4$ is independently hydrogen or an alkyl group having 1 to 3 carbon atoms, and m is 1 or 2.

Japanese Laid-Open Patent Publication No. 91122/1990 discloses a thermoplastic copolyamide resin comprising 5 to 95 mol % of the recurring above formula (A) and 95 to 5 mol % of the recurring unit of the following formula (B),

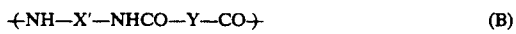

(B)

wherein each of X' and Y is independently a divalent organic group, and having a number average molecular weight in the range of 5,000 to 300,000.

However, as far as those noncrystalline polyamides disclosed in the above prior arts are concerned, there has been and is room for further improvement in properties such as transparency, heat resistance, resistance to chemicals such as ethanol, etc., water absorption, and dimensional stability and moldability when molded into articles.

It is an object of the present invention to provide a novel polyamide.

It is another object of the present invention to provide a novel polyamide which is excellent in transparency and heat resistance.

It is further another object of the present invention to provide a novel copolyamide which is excellent in transparency and heat resistance and which is also excellent in mechanical strength.

It is still another object of the present invention to provide a novel copolyamide which is excellent in transparency, heat resistance and mechanical strength and which is also excellent in chemical resistance and boiling water resistance.

Further, it is another object of the present invention to provide a process for the production of a novel polyamide having the above excellent properties.

The above and other objects and advantages of the present invention will be apparent from the following description.

According to the present invention, the above objects and advantages of the present invention are achieved, first, by a polyamide comprising the recurring unit of the following formula (I),

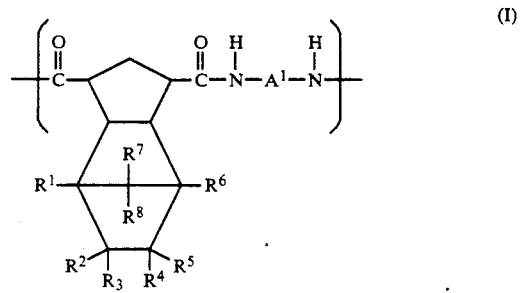

(I)

wherein each of $R^1$, $R^2$, $R^3$, $R^4$, $R^5$, $R^6$, $R^7$ and $R^8$ is independently a hydrogen atom, a halogen atom, a hydroxyl group, or a group of a carbon skeleton which may contain a hetero atom or a halogen atom, and $A^1$ is a divalent hydrocarbon group.

Figure 1:
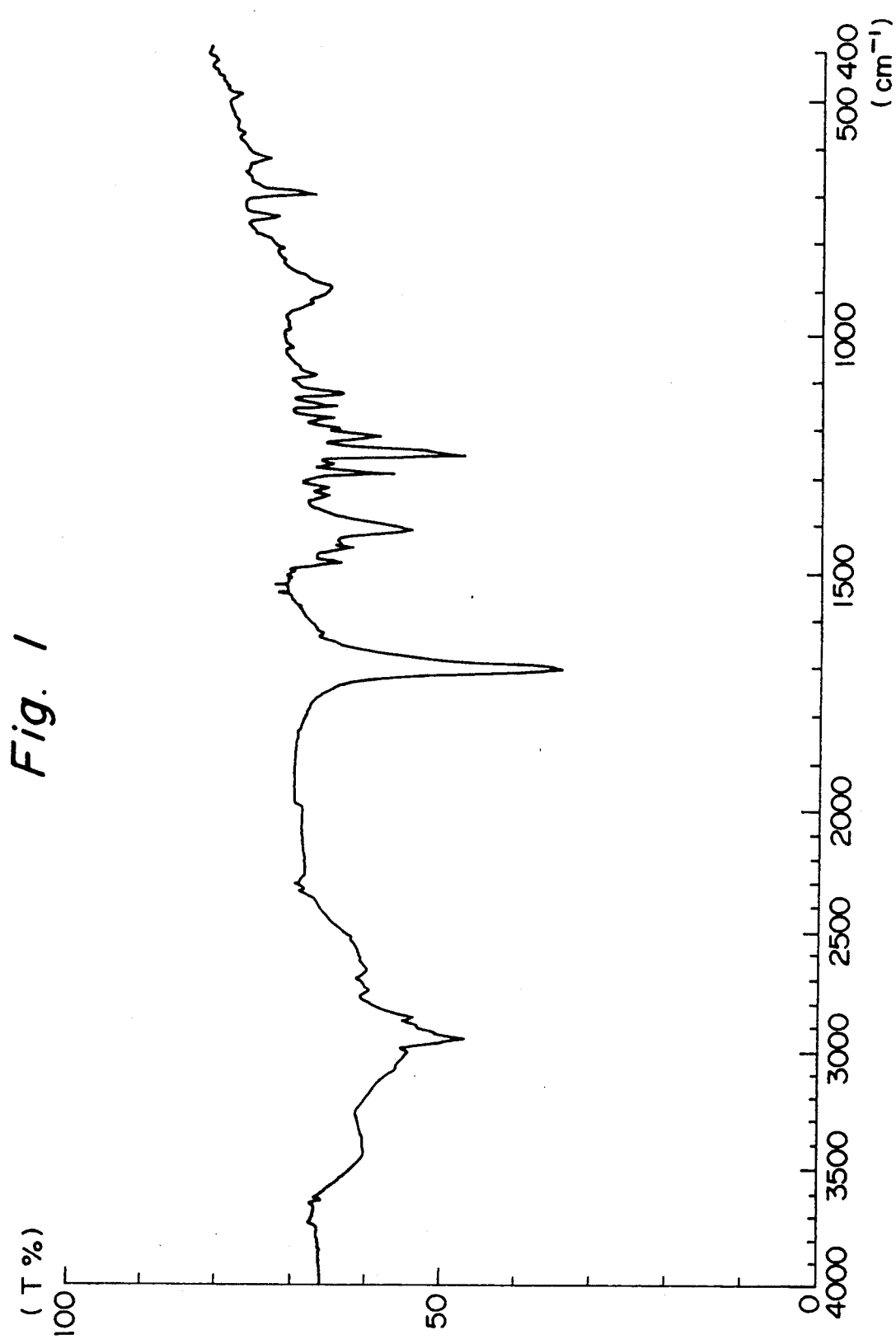
FIG. 1 shows an infrared absorption spectrum chart of 3,5-tricyclo[5.2.1.0²·⁶]decanedicarboxylic acid (to be abbreviated as TCDA hereinafter).

The polyamide of the present invention has its characteristic feature in that it has the recurring unit of the formula (I).

In the formula (I), each of $R^1$ to $R^8$ is independently a hydrogen atom, a halogen atom, a hydroxyl group or a group of a carbon skeleton which may contain a hetero atom or a halogen atom.

Examples of the halogen atom are preferably fluorine, chlorine, bromine and iodine atoms.

In the group of a carbon skeleton which may contain a hetero atom or a halogen atom, examples of the hetero atom are oxygen, nitrogen and sulfur atoms, and examples of the halogen atom are as those described above.

Examples of the above group of a carbon skeleton are groups having neither a hetero atom nor a halogen atom such as an alkyl group and an aromatic hydrocarbon group; hetero atom-containing groups such as an alkoxy group, an alkoxycarbonyl group, an acyl group and a —CN group; and halogen atom-containing groups such as a perfluoroalkyl group.

As the above alkyl group, preferred are those having 1 to 30 carbon atoms, and more preferred are those having 1 to 20 carbon atoms. These alkyl groups may be linear or branched. Specific examples of the alkyl group are methyl, ethyl, propyl, n-butyl, tert-butyl, n-pentyl, n-hexyl, cyclohexyl, n-decyl and stearyl groups, etc.

As the above aromatic hydrocarbon group, preferred are those having 6 to 20 carbon atoms, and more preferred are those having 6 to 12 carbon atoms. These aromatic hydrocarbon groups may have a substituent such as an alkyl group, a halogen atom, a —CN group, a —$NO_2$ group, an acyl group, an alkoxy group, etc.

Specific examples of the aromatic hydrocarbon group are phenyl, tolyl, xylyl, mesityl, benzyl, indenyl, anisoyl groups and the like.

As the above alkoxy group, preferred are those having 1 to 20 carbon atoms, and more preferred are those having 1 to 10 carbon atoms. These alkoxy groups may be linear or branched. Specific examples of the alkoxy group are methoxy, ethoxy, propoxy, tert-butoxy groups and the like.

As the above alkoxycarbonyl group, preferred are those having 1 to 20 carbon atoms. Examples of the alkoxycarbonyl group are preferably methoxycarbonyl, ethoxycarbonyl, tert-butoxycarbonyl groups and the like.

As the above perfluoroalkyl group, preferred are those having 1 to 10 carbon atoms. Examples of the perfluoroalkyl group are perfluoromethyl, perfluoroethyl, perfluoropropyl, perfluorobutyl, perfluorohexyl groups and the like.

In the above formula (I), $A^1$ is a divalent hydrocarbon group. The divalent hydrocarbon group is preferably selected from divalent aliphatic, alicyclic and aromatic hydrocarbon groups.

Examples of the divalent aliphatic hydrocarbon group are linear or branched hydrocarbon groups which preferably have 1 to 25 carbon atoms, more preferably 4 to 18 carbon atoms.

Examples of the divalent alicyclic hydrocarbon group are those which preferably have 3 to 25 carbon atom ring members, more preferably 3 to 15 carbon atom ring members.

Examples of the divalent aromatic hydrocarbon group are those which preferably have 6 to 25 carbon atom ring members, more preferably 6 to 20 carbon atom ring members.

The above alicyclic and aromatic hydrocarbon groups may have a substituent, e.g. an alkyl group.

In the above formula (I), the moiety of the two carbonyl groups and the alicyclic group being interposed between the above two carbonyl groups and having $R^1$ to $R^8$ groups are derived from a dicarboxylic acid component to be described later. And, the moiety of the two amino groups (—NH—) and the divalent hydrocarbon group ($A^1$) is derived from a diamine component to be described later.

Therefore, specific examples of the recurring unit of the formula (I) will be apparent from the dicarboxylic acid component and the diamine component which are to be described later.

The polyamide of the present invention has the recurring unit of the above formula (I). This polyamide may mainly comprise the recurring unit of the formula (I) or may substantially consist of the recurring unit of the formula (I).

The polyamide of the present invention is excellent in transparency, heat resistance and chemical resistance.

The polyamide of the present invention may contain other recurring unit(s) in addition to the recurring unit of the above formula (I), and examples of such "other recurring unit(s)" are preferably a recurring unit of the formula (II),

wherein $Ar^1$ is a divalent aromatic group selected from the group consisting of

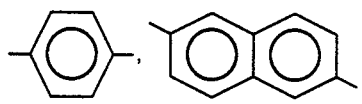

and

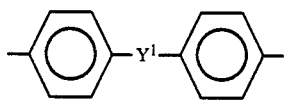

in which $Y^1$ is —$CH_2$, —O—, —$SO_2$— or —CO—, and $A^1$ is a divalent hydrocarbon group, and a recurring unit of the formula (III),

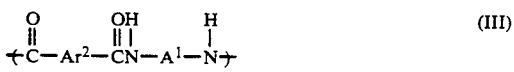

wherein $Ar^2$ is a divalent aromatic group selected from the group consisting of

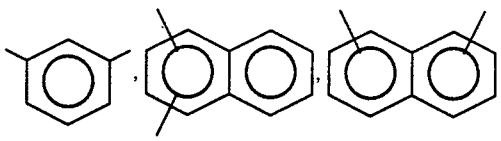

(excluding 2,6-naphthylene) and

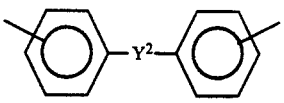

(excluding a 4,4'-form) in which $Y^2$ is —$CH_2$—, —O—, —$SO_2$— or —CO—, and $A^1$ is a divalent hydrocarbon group.

In the above formula (II), $Ar^1$ is a divalent aromatic group (to be sometimes referred to as "divalent first aromatic group" hereinafter) selected from the group consisting of p-phenylene ( 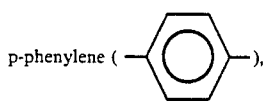 ), 2,6-naphthylene ( 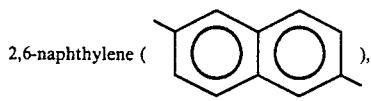 ),

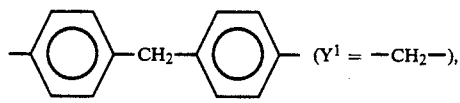 ($Y^1 = -CH_2-$),

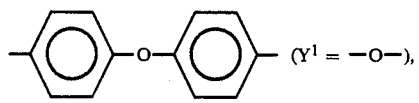 ($Y^1 = -O-$),

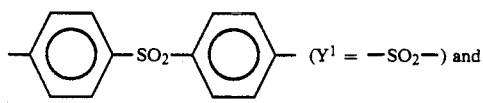 ($Y^1 = -SO_2-$) and

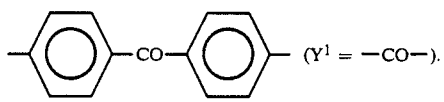 ($Y^1 = -CO-$).

In the above formula (II), $A^1$ is a divalent hydrocarbon group, and it is specifically selected from those examples described with regard to $A^1$ in the formula (I).

In the above formula (II), the $-CO-Ar^1-CO-$ moiety is derived from a dicarboxylic acid component to be described later, and the $-NH-A^1-NH-$ moiety is derived from a diamine component to be described later.

Therefore, specific examples of the recurring unit of the formula (II) will be apparent from the dicarboxylic acid component and diamine component which are to be described later.

In the above formula (III), $Ar^2$ is a divalent aromatic group (to be sometimes referred to as "divalent second aromatic group" hereinafter) selected from the group consisting of m-phenylene ( 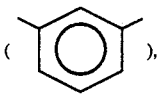 ),

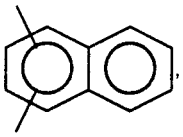

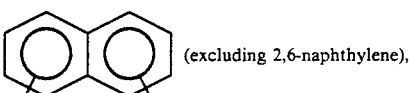 (excluding 2,6-naphthylene),

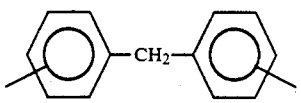

($Y^2 = -CH_2-$, excluding 4,4'-form),

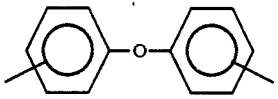

($Y^2 = -O-$, excluding 4,4'-form),

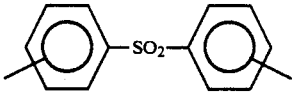 and ($Y^2 = -SO_2-$, excluding 4,4'-form)

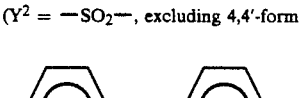

($Y^2 = -CO-$, excluding 4,4'-form).

In the formula (III), $A^1$ is a divalent hydrocarbon group, and specific examples thereof are those specified with regard to $A^1$ in the formula (I).

In the formula (III), the $-CO-Ar^2-CO-$ moiety is derived from a dicarboxylic acid component to be described later, and the $-NH-A^1-NH-$ moiety is derived from a diamine component to be described later.

Therefore, specific examples of the recurring unit of the formula (III) will be apparent from the dicarboxylic acid component and diamine component to be described later.

The polyamide of the present invention which has the recurring unit of the formula (II) preferably and mainly comprises the recurring unit of the formula (I) and the recurring unit of the formula (II). And, on the basis of the total amount of these two recurring units, the amount of the recurring unit of the formula (I) is preferably 99 to 40 mol %, more preferably 80 to 40 mol %, and the amount of the recurring unit of the formula (II) is preferably 1 to 60 mol %, more preferably 20 to 60 mol %.

Of polyamides which have the recurring unit of the formula (II) in the present invention, particularly preferred is a polyamide which substantially consists of the recurring unit of the formula (II) and the recurring unit of the formula (I).

The polyamide of the present invention which has the recurring unit of the formula (II) is excellent in transparency, heat resistance and chemical resistance, and further, it is also excellent in boiling water resistance and mechanical strength such as flexural strength and impact resistance.

The polyamide of the present invention which has the recurring unit of the formula (III) preferably and mainly comprises the recurring unit of the formula (I) and the recurring unit of the formula (III). And, on the basis of the total amount of these two recurring units, the amount of the recurring unit of the formula (I) is preferably 99 to 1 mol %, more preferably 80 to 30 mol %, and the amount of the recurring unit of the formula (III) is preferably 1 to 99 mol %, more preferably 20 to 70 mol %.

The above polyamide of the present invention which has the recurring unit of the formula (III) may further contain less than 50 mol %, based on the total recurring units, of the recurring unit of the formula (II), or it may substantially consist of the recurring unit of the formula (I) and the recurring unit of the formula (III).

The above polyamide of the present invention which has the recurring unit of the formula (III) is excellent in transparency, heat resistance and chemical resistance, and further, it is also excellent in mechanical strength.

Any of the polyamides of the present invention preferably has an intrinsic viscosity [$\eta$], measured in concentrated sulfuric acid at 30° C., in the range of 0.4 to 4.0 dl/g, more preferably in the range of 0.6 to 3.0 dl/g, particularly preferably in the range of 0.6 to 2.0 dl/g.

The above polyamides of the present invention preferably have a glass transition temperature (Tg) in the range of 50° to 300° C., more preferably in the range of 100° to 250° C.

In the polyamide of the present invention, the tricyclo[5.2.1.0$^{2,6}$]decane structure has bonds at the 3- and 5-positions to constitute the recurring unit of the formula (I). Therefore, the polyamide of the present invention has a structure in which the bulky tricyclo[5.2.1.0$^{2,6}$]decane structure projects out of the polyamide chain. Owing to this structure, the polyamide of the present invention is amorphous or lowly crystalline, and its crystallinity is usually not more than 5%, preferably not more than 3%, more preferably not more than 1%.

The polyamide of the present invention has excellent transparency. This is apparent, for example, from the fact that its light transmittance is usually in the range of 80 to 95% when measured according to ASTM-D-1003.

The polyamide of the present invention has characteristic feature that its transparency is hardly deteriorated even when it is subjected to annealing treatment or chemical treatment.

The polyamide of the present invention is produced, basically, by the polycondensation reaction of a dicarboxylic acid comprising an alicyclic dicarboxylic acid of the formula (a)-1,

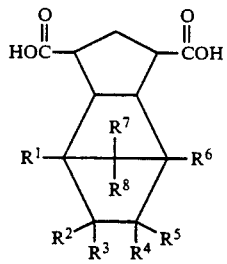
(a)-1 wherein R$^1$, R$^2$, R$^3$, R$^4$, R$^5$, R$^6$, R$^7$ and R$^8$ are as defined in the formula (I), and a diamine of the formula (b)-1,

(b)-1 wherein A$^1$ is as defined in the formula (I).

The alicyclic dicarboxylic acid of the formula (a)-1 can be produced by oxidizing a corresponding cyclic olefin while opening its ring.

For example, tetracyclo[4.4.0.1$^{2,5}$0.1$^{7,10}$]-3-dodecene or its derivative is oxidized with an oxidizing agent such as potassium permanganate, etc., with ozone or with oxygen in the presence of a metal catalyst to cleave it in the double bond portion, and carbon atoms in this portion are further oxidized, whereby 3,5-tricyclo[5.2.1.0$^{2,6}$]decanedicarboxylic acid or a derivative thereof can be formed.

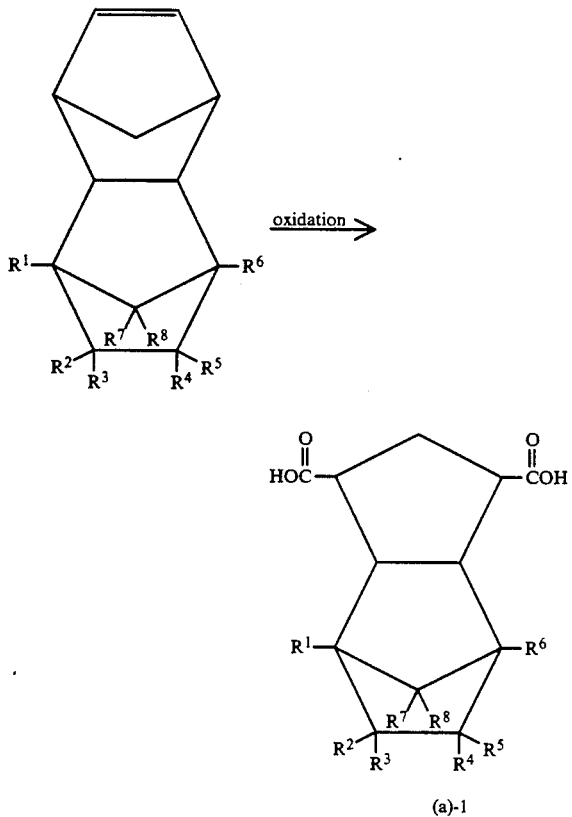
(a)-1 wherein R$^1$, R$^2$, R$^3$, R$^4$, R$^5$, R$^6$, R$^7$ and R$^8$ are as defined above.

The process for producing the above alicyclic dicarboxylic acid is detailed in Soloway, J. Am. Chem. Soc., 1952, 74, 1027.

As is clear from the above reaction scheme, specific examples of the alicyclic dicarboxylic acid of the formula (a)-1 will be apparent from specific examples of the cyclic olefin, which will be described below.

Tetracyclo[4.4.0.1$^{2,5}$,1$^{7,10}$]-3-dodecene

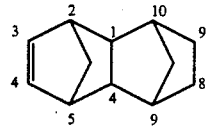

8-methyltetracyclo[4.4.0.1$^{2,5}$,1$^{7,10}$]-3-dodecene,
8-ethyltetracyclo[4.4.0.1$^{2,5}$,1$^{7,10}$]-3-dodecene,
8-propyltetracyclo[4.4.0.1$^{2,5}$,1$^{7,10}$]-3-dodecene,
8-hexyltetracyclo[4.4.0.1$^{2,5}$,1$^{7,10}$]-3-dodecene,
8-stearyltetracyclo[4.4.0.1$^{2,5}$,1$^{7,10}$]-3-dodecene,
8,9-dimethyltetracyclo[4.4.0.1$^{2,5}$,1$^{7,10}$]-3-dodecene,
8-ethyl-9-methyltetracyclo[4.4.0.1$^{2,5}$,1$^{7,10}$]-3-dodecene,
8-chlorotetracyclo[4.4.0.1$^{2,5}$,1$^{7,10}$]-3-dodecene,
8-bromotetracyclo[4.4.0.1$^{2,5}$,1$^{7,10}$]-3-dodecene,
8-fluorotetracyclo[4.4.0.1$^{2,5}$,1$^{7,10}$]-3-dodecene,
8,9-dichlorotetracyclo[4.4.0.1$^{2,5}$,1$^{7,10}$]-3-dodecene, 8-cyclohexyltetracyclo[4.4.0.1$^{2,5}$,1$^{7,10}$]-3-dodecene,
8-isobutyltetracyclo[4.4.0.1$^{2,5}$,1$^{7,10}$]-3-dodecene,
8-butyltetracyclo[4.4.0.1$^{2,5}$,1$^{7,10}$]-3-dodecene,
8-cyanotetracyclo[4.4.0.1$^{2,5}$,1$^{7,10}$]-3-dodecene,
8-acetoxytetracyclo[4.4.0.1$^{2,5}$,1$^{7,10}$]-3-dodecene,
8-methoxytetracyclo[4.4.0.1$^{2,5}$,1$^{7,10}$]-3-dodecene,
8-phenyltetracyclo[4.4.0.1$^{2,5}$,1$^{7,10}$]-3-dodecene,
8,8,9-trifluoro-9-trifluoromethyltetracyclo[4.4.0.1$^{2,5}$,1$^{7,10}$]-3-dodecene.

The above cyclic olefins may be used alone or in combination.

The alicyclic dicarboxylic acid obtained by the oxidation of the above cyclic olefin, e.g. tetracyclo[4.4.0.1$^{2,5}$,1$^{7,10}$]-3-dodecene, includes stereoisomers such as an exo-endo isomer, an exo-exo isomer, an endo-endo isomer and an endo-exo isomer as shown below. In the present invention, any one of these stereoisomers and a mixture of these stereoisomers in any mixing ratio can be used.

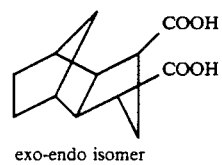
exo-endo isomer

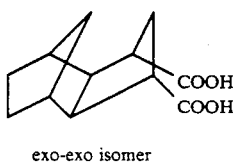
exo-exo isomer

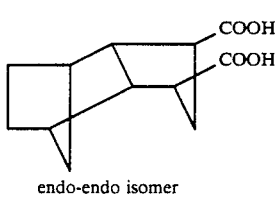
endo-endo isomer

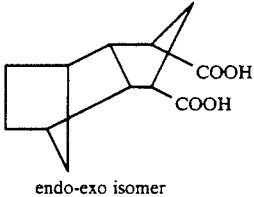
endo-exo isomer

The dicarboxylic acid used in the present invention comprises the above alicyclic dicarboxylic acid.

Other dicarboxylic acid usable in combination with the above alicyclic dicarboxylic acid can be selected, for example, from:

alicyclic dicarboxylic acid similarly derived from cyclic olefins other than the above tetracyclo-compounds, such as bicyclo[2.2.1]hept-2-ene derivative, hexacyclo[6.6.1.1$^{3,6}$.1$^{10,13}$.0$^{2,7}$.0$^{9,14}$]-4-heptadecene derivative, octacyclo[8.8.0.1$^{2,9}$.1$^{4,7}$.1$^{11,18}$.1$^{13,16}$.0$^{3,8}$.0$^{12,17}$]-5-docosene derivative, pentacyclo[6.6.1.1$^{3,6}$.0$^{2,7}$.0$^{9,14}$]-hexadecene derivative, heptacyclo-5-eicosene derivative, heptacyclo-5-heneicosene derivative, tricyclo[4.3.0.1$^{2,5}$]-3-decene derivative, tricyclo[4.3.0.1$^{2,5}$]-3-undecene derivative, pentacyclo[6.5.1.1$^{3,6}$.0$^{2,7}$.0$^{9,13}$]-4-pentadecene derivative, and pentacyclopentadecadiene, etc;

alicyclic dicarboxylic acid having 3 to 15 carbon atoms and optionally having substituent(s) and hetero atom(s), such as 1,4-, 1,3- or 1,2-cyclohexane dicarboxylic acid, dicyclohexylmethane-4,4'-dicarboxylic acid;

aromatic dicarboxylic acids having 6 to 20 carbon atoms and optionally having substituent(s) such as

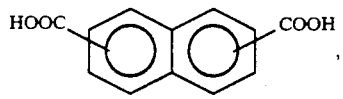

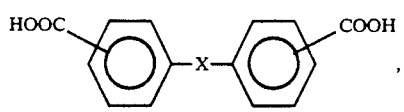

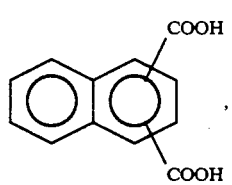

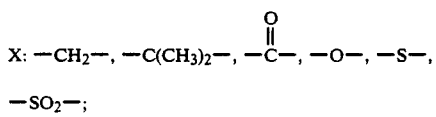

linear or branched aliphatic dicarboxylic acids optionally having substituent(s) and hetero atom(s) such as succinic acid, glutaric acid, adipic acid, azelaic acid and sebasic acid.

These "other dicarboxylic acids" may be used alone or in combination in such a proportion that the characteristic features of the polyamide of the present invention can be retained.

Preferably the dicarboxylic acid used in the present invention mainly comprises the alicyclic dicarboxylic acid of the formula (a)-1, and more preferably it substantially consists of the alicyclic dicarboxylic acid of the formula (a)-1.

On the other hand, the diamine used in the present invention is represented by the above formula (b)-1. In the formula (b)-1, A$^1$ is as defined in the formula (I).

The above diamine component is selected from aliphatic diamines, alicyclic diamines and aromatic diamines. Examples of the aliphatic diamines (diamine component having a divalent aliphatic hydrocarbon group) are tetramethylenediamine, hexamethylenediamine, octamethylenediamine, decamethylenediamine, dodecamethylenediamine, 2,2,4-trimethylhexamethyldiamine, 2,4,4-trimethylhexamethyldiamine and dimethyloctamethylenediamine.

Examples of the alicyclic diamines (diamine component having a divalent alicyclic hydrocarbon group) are 4,4'-methylenebis(cyclohexyl); bis(4-aminocyclohexyl)propane; 4,4'-diamino-3,3'-dimethylcyclohexylmethane; isophoronediamine; piperazine; cyclopropanediamine of the formula (b)-11

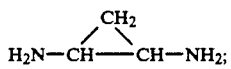
(b)-11 cyclopropyldimethyleneamine of the formula (b)-12

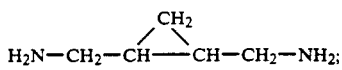
(b)-12;

cyclohexanediamine of the formula (b)-13

cyclohexanedimethyleneamine of the formula (b)-14

bicyclo[2.2.1]hept-2-ene of the formula (b)-15

diamine of any one of the above formulae (b)-11 to (b)-15 in which the alicyclic ring moiety is replaced with a substituent such as an alkyl group having 1 to 4 carbon atoms; diamine of the formula (b)-16

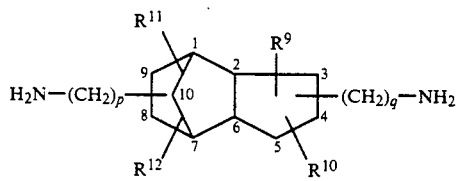

wherein each of $R^9$, $R^{10}$, $R^{11}$ and $R^{12}$ is independently a hydrogen atom or an alkyl group having 1 to 4 carbon atoms, and each of p and q is an integer of 0 to 2, such as 3,8-, 4,8- or 5,8-tricyclo[5.2.1.0$^{2,6}$]-decanediamine, and mixtures thereof; 3,8-, 4,8- or 5,8-bis(aminomethyl)-tricyclo[5.2.1.0$^{2,6}$]decane, and mixtures thereof; and diamine of the formula (b)-17

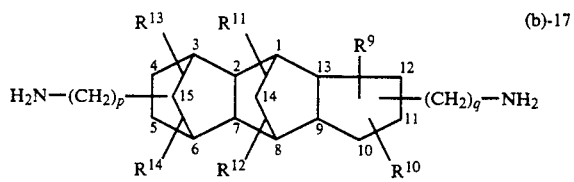

wherein $R^9$ to $R^{12}$, p and q are as defined above, and each of $R^{13}$ and $R^{14}$ has the same meaning as that of $R^9$ to $R^{12}$, such as 4,10-, 4,11- and 4,12-pentacyclo-[6.5.1.1$^{3,6}$.0$^{2,7}$.0$^{9,13}$]-pentadecanediamines, and mixtures thereof.

The aromatic diamine (diamine component having a divalent aromatic group) is selected, for example, from:
diamine of the formula (b)-18,

wherein p and q are as defined above, provided that the benzene ring may have a substituent such as an alkyl group having 1 to 4 carbon atoms, such as p-phenylenediamine, m-phenylenediamine, p-xylenediamine, m-xylenediamine, 2,4-tolylenediamine and 2,6-tolylenediamine,
diamine of the formula (b)-19

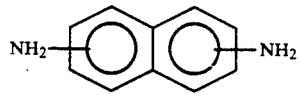

wherein the naphthalene ring may have a substituent such as an alkyl group having 1 to 4 carbon atoms, such as 1,8-diaminonaphthalene and 2,6-diaminonaphthalene, diamine of the formula (b)-20,

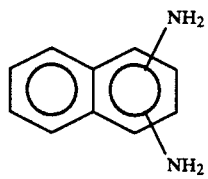

wherein the naphthalene ring may have a substituent such as an alkyl group having 1 to 4 carbon atoms, such as 1,4-diaminonaphthalene and 2,3-diaminonaphthalene, and
diamine of the formula (b)-21,

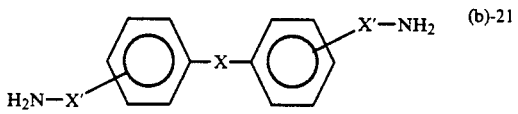

wherein X is a single bond or any group of —CO—, —SO$_2$—, —S—, —O—, —C(CH$_3$)$_2$—, —NHCONH— and —CONH—, and each of X's is independently a single bond or an alkylene group having 1 to 4 carbon atoms, provided that the benzene rings may have a substituent such as an alkyl group having 1 to 4 carbon atoms such as 4,4'-diamino-diphenylmethane, 3,4-diaminodiphenylmethane, 4,4'-diaminodiphenylpropane, 4,4'-diaminodiphenyl ether and 4,4'-diaminodiphenylsulfone.

In addition, in the process of the present invention, there may be used an aromatic polyamine having not less than three amino groups in an amount of not more than 10% by weight based on the diamine component.

In the present invention, the above diamines may be used alone or in combination.

In the present invention, the above diamine component and dicarboxylic acid component are generally used in the diamine component/dicarboxylic acid component molar ratio of 0.9 to 1.2, preferably 0.9 to 1.1.

The polyamide of the present invention can be prepared by subjecting the above diamine component and dicarboxylic acid component to polycondensation, for example, according to any one of:

(1) a method in which a nylon salt of these two components is prepared, and this nylon salt is polymerized in a molten state, (2) a method in which an oligomer is prepared from the dicarboxylic acid component and the diamine component and the oligomer is polymerized in a molten state, and (3) a method in which an oligomer prepared as above is polymerized with an extruder.

For example, in the method of preparing an oligomer from the dicarboxylic acid component and the diamine component and polymerizing the oligomer in a molten state, there is prepared a mixture containing the dicarboxylic acid component prepared as above and the diamine component as described above, and the mixture is heated under pressure under an atmosphere of an inert gas such as nitrogen, whereby an oligomer of these two components is formed. The reaction temperature for the preparation of this oligomer is usually set at a temperature between 150° C. and 300° C., preferably between 200° C. and 280° C. Under the above heating conditions, the reaction pressure may be applied by means of a separate pressure means. However, it is preferred to add water into the system and utilize the pressure generated by heating the water.

When the above oligomer is prepared, a catalyst may be used. The catalyst is selected from those which are generally used for the condensation reaction of dicarboxylic acid and diamine, and it can be particularly preferably selected from phosphoric acid-based catalysts. Examples of such catalyst are sodium hypophosphite, calcium hypophosphite, phosphoric acid, octyl phosphate, methyl acid phosphate and tristridecyl phosphite. The amount of the catalyst for use is generally in the range of 0.01 to 5 mol % based on the dicarboxylic acid component.

The intrinsic viscosity [$\eta$] of the oligomer prepared as above is usually 0.03 to 0.50 dl/g, preferably 0.06 to 0.30 dl/g, measured in concentrated sulfuric acid at 30° C.

In general, the above oligomer is dried, and the dried oligomer is further heated, whereby the object polyamide is produced. The temperature for the above heating is generally set at a temperature between 200° C. and 380° C., preferably between 250° C. and 350° C. During the reaction for this production of the polyamide, water is formed. It is therefore preferred to carry out the reaction with removing the water formed. The reaction is preferably carried out under a reduced pressure to remove the water formed.

In addition to the above process in which the dicarboxylic acid component comprising the alicyclic dicarboxylic acid of the formula (a)-1 and the diamine component of the formula (b)-1 are reacted with each other, the polyamide of the present invention can be also produced by subjecting the diamine component and either a corresponding dicarboxylic acid halide alone or a combination of a corresponding dicarboxylic acid halide with the carboxylic acid component to a polycondensation reaction according to a solution polymerization or interfacial polymerization method.

According to the process of the present invention, the polyamide comprising the recurring unit of the formula (I), provided by the present invention, can be produced as described above.

The polyamide of the present invention obtained as above has excellent transparency, and further is excellent in chemical resistance, ethanol resistance in particular, and is hardly swollen or dissolved in ethanol even if kept in contact with ethanol for a long period of time.

The polyamide having the recurring unit of the formula (II), provided by the present invention, can be produced by subjecting a dicarboxylic acid mainly containing the alicyclic dicarboxylic acid of the formula (a)-1 and a first aromatic dicarboxylic acid of the formula (a-2),

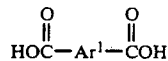 (a)-2 wherein $Ar^1$ is as defined in the formula (II), and the diamine of the formula (b)-1 to a polycondensation reaction.

The above first aromatic dicarboxylic acid of the formula (a)-2 is selected from terephthalic acid, 2,6-naphthalenedicarboxylic acid, diphenylmethane-4,4'-dicarboxylic acid, diphenyl ether-4,4'-dicarboxylic acid, benzophenone-4,4'-dicarboxylic acid and diphenylsulfone-4,4'-dicarboxylic acid.

The above first aromatic dicarboxylic acids may be used alone or in combination.

The alicyclic dicarboxylic acid and the diamine are selected from those specified previously.

The dicarboxylic acid used in the above process of the present invention, preferably, substantially consists of the alicyclic dicarboxylic acid of the formula (a)-1 and the first aromatic dicarboxylic acid of the formula (a)-2.

The diamine/dicarboxylic acid (aliphatic dicarboxylic acid and first aromatic dicarboxylic acid) molar ratio is preferably 0.9 to 1.2, more preferably 0.9 to 1.1.

The aliphatic dicarboxylic acid/first aromatic dicarboxylic acid molar ratio is preferably 99/1 to 40/60, more preferably 80/20 to 40/60.

The above process of the present invention can be specifically carried out according to any one of the above methods (1), (2) and (3) and a method (4) in which nylon salts or oligomers are prepared from these components, and these nylon salts or oligomers are mixed and polymerized in a molten state.

When the amount of the first aromatic dicarboxylic acid is not less than 30 mol % based on the total amount of dicarboxylic acids, it is particularly preferred to employ the method (3). In this case, for example, the oligomer is prepared from the dicarboxylic acids and diamine in the same manner as in the method (2), and the oligomer is polymerized with a twin-screw extruder at a temperature between 250° C. and 380° C.

In addition, as far as the other description is concerned, it should be understood that the description on the former process of the present invention can directly apply to the above process of the present invention using the first aromatic dicarboxylic acid.

According to the above process of the present invention, the polyamide mainly comprising the recurring unit of the formula (I) and the recurring unit of the formula (II) can be produced as described above.

The polyamide of the present invention, obtained as above, not only has excellent transparency and heat resistance but also has excellent elasticity and strength such as excellent flexural modulus, flexural strength, Izod impact strength, etc.

Further, the polyamide of the present invention has excellent chemical resistance, particularly excellent resistance to ethanol, chloroform and acetic acid, which conventional amorphous polyamides are devoid of, and the polyamide of the present invention does not change in properties even if kept in contact with these chemicals for a long period of time.

Furthermore, the polyamide of the present invention also has excellent boiling water resistance, and hence does not show whitening even under boiling water treatment.

The polyamide of the present invention can be used in the fields where conventional polyamides are used. Due to the above excellent properties, it can be further used in the fields of various molded articles, fibers, films, etc.

Moreover, according to the present invention, the polyamide having the recurring unit of the formula (III), provided by the present invention, can be produced by subjecting a dicarboxylic acid mainly comprising the alicyclic dicarboxylic acid of the formula (a)-1 and the second aromatic dicarboxylic acid of the formula (a)-3,

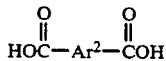

(a)-3 wherein $Ar^2$ is as defined in the formula (III), and the diamine of the formula (b)-1 to a polycondensation reaction.

The second aromatic dicarboxylic acid of the formula (a)-3 is selected from isophthalic acid, 1,4-naphthalenedicarboxylic acid, 1,8-naphthalenedicarboxylic acid, 2,7-naphthalenedicarboxylic acid, diphenylmethane-3,4'-dicarboxylic acid, diphenylmethane-3,3'-dicarboxylic acid, diphenylmethane-2,4'-dicarboxylic acid, benzophenone-3,4'-dicarboxylic acid, benzophenone-3,3'-dicarboxylic acid, diphenyl ether-3,4'-dicarboxylic acid, diphenyl ether-3,3'-dicarboxylic acid, diphenyl ether-2,4'-dicarboxylic acid, diphenylsulfone-3,4'-dicarboxylic acid, diphenylsulfone-3,3'-dicarboxylic acid and diphenylsulfone-2,4'-dicarboxylic acid.

The above second aromatic dicarboxylic acids may be used alone or in combination.

The alicyclic dicarboxylic acid and the diamine are selected from those specified previously.

The dicarboxylic acid used in the above process of the present invention may further contain not more than 50 mol%, based on the total carboxylic acid amount, of the first aromatic dicarboxylic acid. Preferably the dicarboxylic acid substantially consists of the alicyclic dicarboxylic acid of the formula (a)-1 and the second aromatic dicarboxylic acid of the formula (a)-3.

The diamine/dicarboxylic acid (alicyclic dicarboxylic acid and second aromatic dicarboxylic acid) molar ratio is preferably 0.9 to 1.2, more preferably 0.9 to 1.1.

The alicyclic dicarboxylic acid/second aromatic dicarboxylic acid molar ratio is preferably 99/1 to 1/99, more preferably 80/20 to 30/70.

The above process of the present invention can be carried out according to any one of the above methods (1), (2) and (3) and a method (4) in which nylon salts or oligomers are prepared from these components, and these nylon salts or oligomers are mixed and polymerized in a molten state.

In addition, as far as the other description is concerned, it should be understood that the description previously made on the processes of the present invention can directly apply to the above process of the present invention using the second aromatic dicarboxylic acid.

According to the present invention, there can be produced the polyamide mainly comprising the recurring unit of the formula (I) and the recurring unit of the formula (III) as described above.

The polyamide of the present invention, obtained as above, not only has excellent transparency and heat resistance but also has excellent elasticity and strength such as excellent flexural modulus, flexural strength, Izod impact strength, etc.

The polyamide of the present invention can be used in fields where conventional polyamides are used. Due to the above excellent properties, it can be further used in the fields of various molded articles, fibers, films, etc.

The present invention will be described further in detail by reference to Examples, which, however, shall not limit the present invention to the embodiment disclosed therein.

The conditions for measurement of polyamides for the properties in the following Examples are as follows:

Intrinsic viscosity [$\eta$]: Measured in concentrated sulfuric acid at 30° C.

Glass transition temperature (Tg): Measured with a DSC apparatus (DSC-2 supplied by Perkin-Elmer Corporation) in a nitrogen gas current at a temperature elevation rate of 10° C./minute.

Flexural strength (FS) and Flexural modulus (FM): Measured on a press-molded test piece having a size of 63.5 mm×12.7 mm×2.0 mm according to ASTM-D790.

Izod impact strength: Measured on a press-molded test piece having a size of 63.5 mm×12.7 mm×2.0 mm according to ASTM D-256 (notched).

Crystallinity: Determined on a press sheet by X-ray diffraction at a wide angle ($2\theta$: 5°–35°) with a Rotor Flex RU-300 supplied by Rigaku Denki K. K.

Transparency: Measured according to ASTM-D-1003.

Chemical resistance: Evaluated on a test piece having a thickness of 2 mm which was immersed at 23° C. for 8 days.

Boiling water resistance: Evaluated on a test piece having a thickness of 2 mm which was treated in boiling water for 5 hours.

NMR: Measured in $CD_3OD$ with GX- 500 supplied by JEOL.

EXAMPLE 1

(1) Synthesis of 3,5-tricyclo[5.2.1.0$^{2,6}$]-decanedicarboxylic acid (TCDA)

An acidic solution of potassium permanganate was added to an acetone solution of tetracyclo[4.4.0.1$^{2,5}$.1$^{7,10}$]-3-dodecene (TD) at 0° C., and the mixture was stirred for 12 hours.

The reaction mixture was neutralized, and then manganese dioxide formed as a by-product was separated by filtration. The filtrate obtained after the filtration of the manganese dioxide was acidified to precipitate a white crystal. The crystal was recovered by filtration and purified. Analysis shows that the crystal was the intended TCDA. It was also found that the TCDA had an exo-endo form.

The above TCDA had the following physical properties.

White Acicular Crystal

Melting point: 265° C. (DSC).

FIG. 1 shows the IR spectrum chart of the above TCDA.

Figure 2:
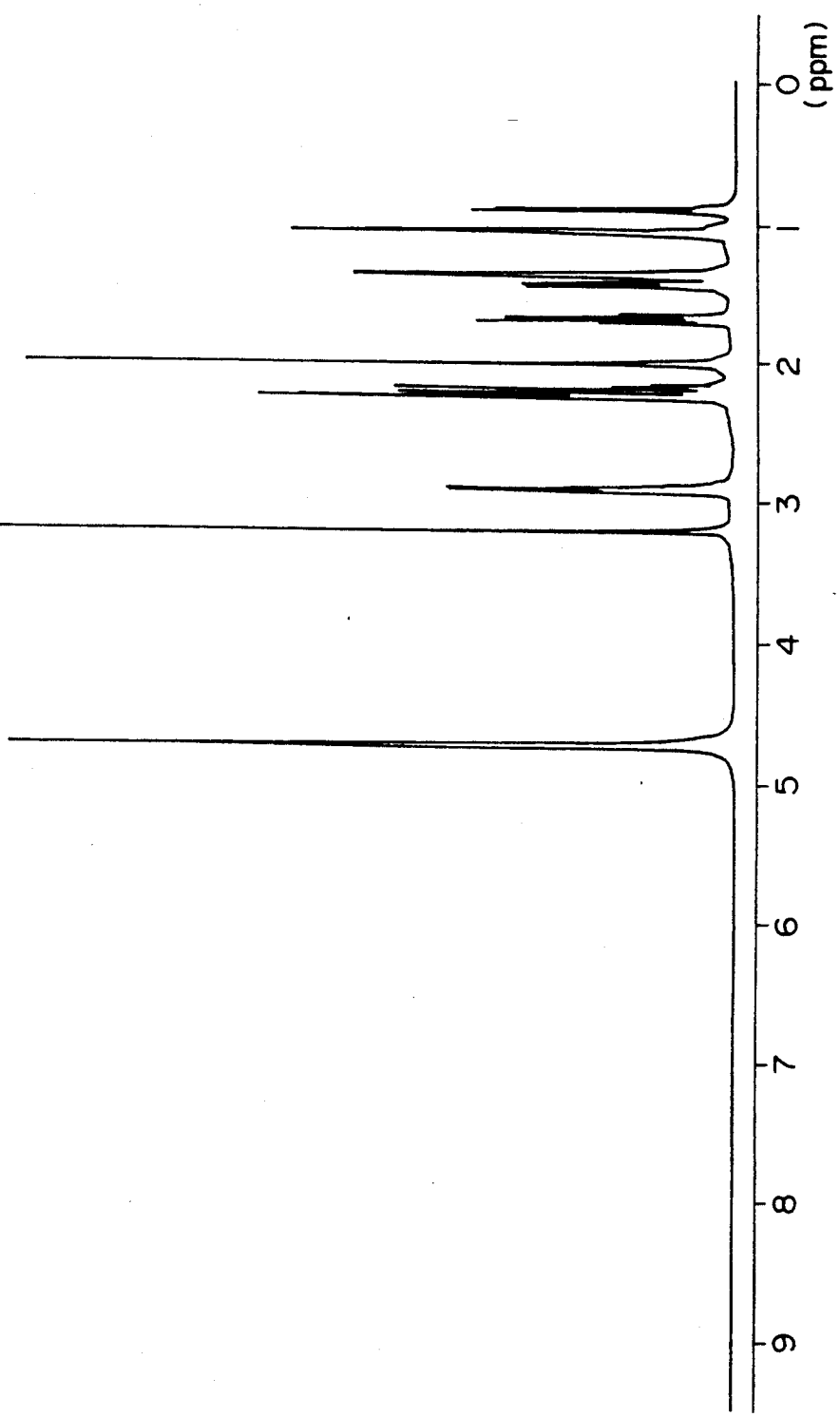
FIG. 2 is a ¹H-NMR spectrum chart of TCDA.

FIG. 2 shows the $^1$H-NMR spectrum chart of the above TCDA.

Figure 3:
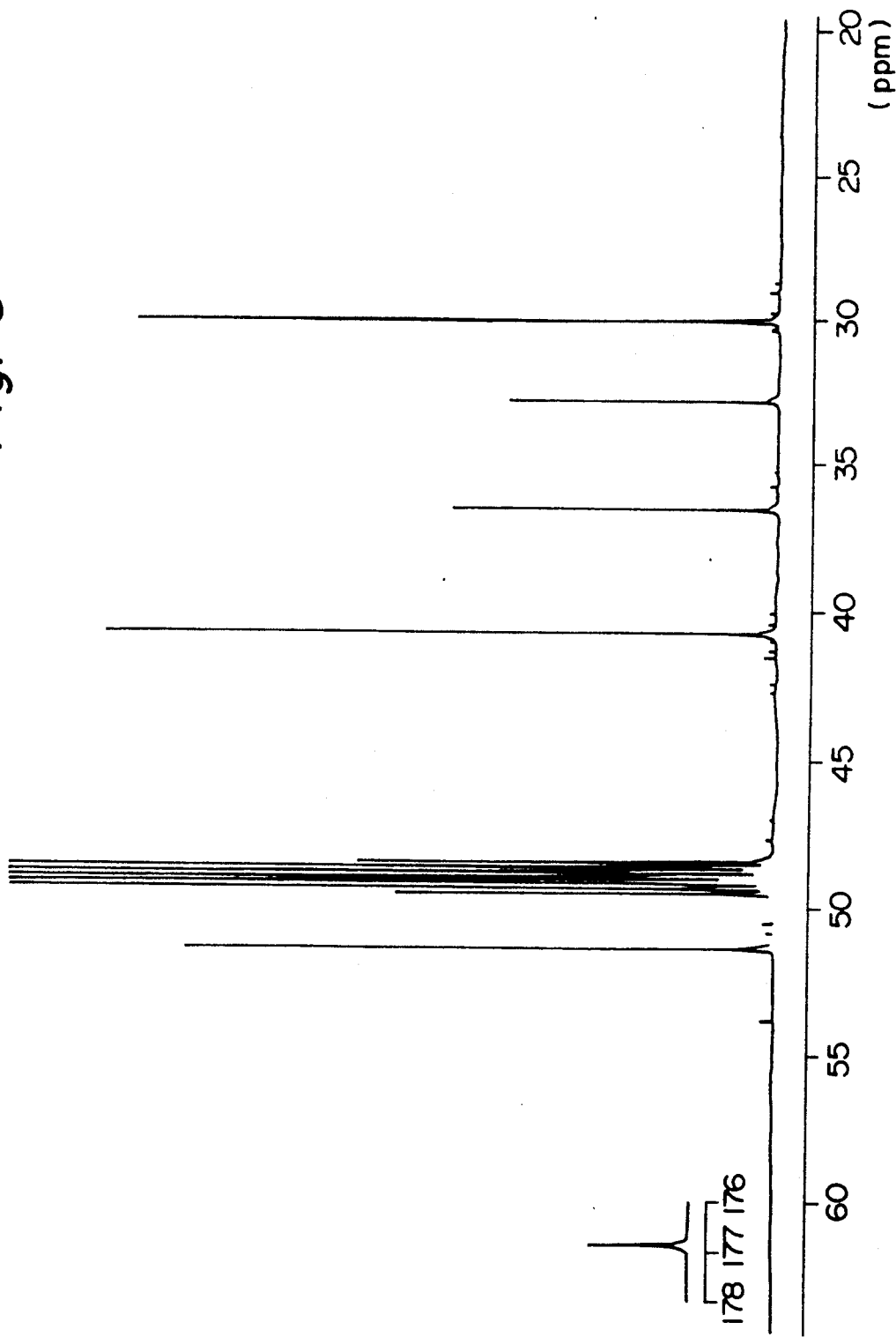
FIG. 3 is a ¹³C-NMR spectrum chart of TCDA.

FIG. 3 shows the $^{13}$C-NMR chart (exo-endo form) of the above TCDA.

(2) Synthesis of Polyamide 65.0 Grams of ion-exchanged water was added to a mixture of 381.2 g of TCDA obtained in the above step (1), 203.5 g of hexamethylenediamine (HMDA) and 0.36 g of sodium hypophosphite monohydrate, and the mixture was charged into an autoclave having an inner volume of 1 liter. Air in the autoclave was fully replaced with nitrogen gas, and then, the pressure in the autoclave was adjusted to a gauge pressure of 0 kg/cm$^2$. While the mixture was stirred, the mixture was heated such that the temperature of the resultant reaction mixture became 250° C. over 2 hours. The reaction mixture was further stirred at this temperature for 1 hour.

Then, the stirring was stopped, and the reaction mixture was drawn from the autoclave bottom at a pressure difference of 10 kg/cm$^2$. The reaction mixture was found to be an oligomer composed from the above TCDA and hexamethylenediamine.

The oligomer drawn from the autoclave as above was dried overnight at a pressure of 400 mmHg in a nitrogen atmosphere under heat at 100° C. The dried oligomer had an intrinsic viscosity [$\eta$] of 0.17 dl/g.

60 Grams of the above-prepared oligomer was charged into a polymerization flask having an inner volume of 100 ml, and air in the flask was fully replaced with a nitrogen gas. Then, while the oligomer was stirred at an atmospheric pressure, the flask was kept at a temperature of 280° C. for 30 minutes to melt the oligomer. Further, the pressure inside the flask was reduced to 0.5 mmHg over 10 minutes, and while the reaction water was distilled off, the oligomer was allowed to react at 280° C. for 3 hours.

The resultant polyamide had an intrinsic viscosity [$\eta$] of 0.71 dl/g and a glass transition temperature (Tg) of 161° C., and the polyamide was colorless and transparent.

Table 1 shows the properties of the above-obtained polyamide.

Figure 4:
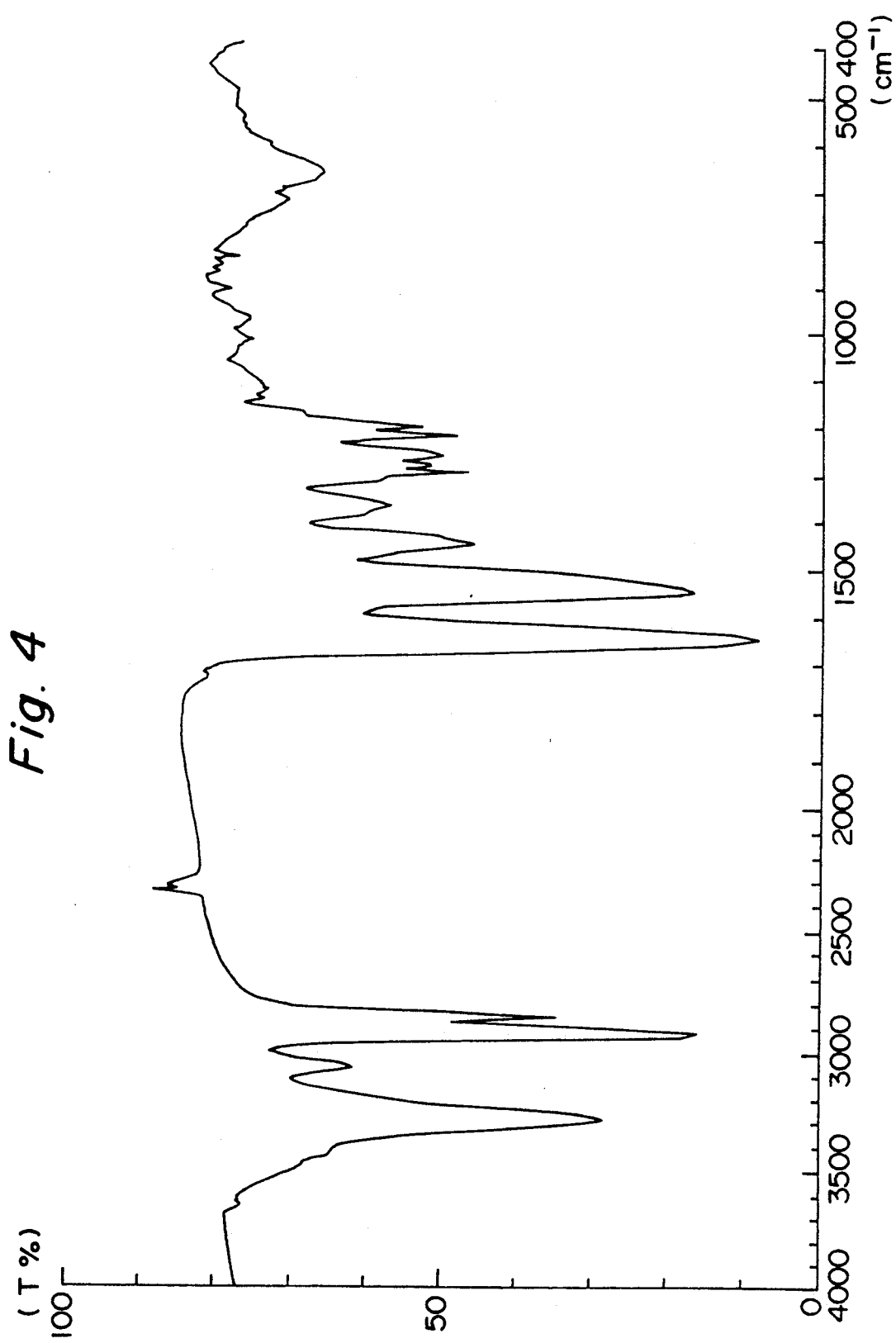
FIG. 4 is an infrared absorption chart of a polyamide of the present invention obtained by polycondensation of TCDA and hexamethylenediamine.

FIG. 4 shows the IR spectrum chart of the polyamide.

EXAMPLE 2

A polyamide was prepared by repeating Example 1, (2) except that the conditions for the reaction in the polymerization flask were changed as follows: The flask was kept at 280° C. for 2 hours, and after the temperature was raised to 300° C., the oligomer was allowed to react for 5 hours.

The resultant polyamide had an intrinsic viscosity [$\eta$] of 0.85 dl/g and a glass transition temperature (Tg) of 161° C., and the polyamide was colorless and transparent.

Table 1 shows the properties of the above-obtained polyamide.

EXAMPLE 3

A 50 ml autoclave was charged with 15.70 g (70 mmol) of TCDA, 8.38 g (72 mmol) of hexamethylenediamine, 0.02 g of sodium hypophosphite monohydrate and 2.68 g of ion-exchanged water, and air in the autoclave was fully replaced with a nitrogen gas. Then, the pressure in the autoclave was adjusted to a gauge pressure of 0 kg/cm$^2$.

The autoclave was placed in a sand bath at 260° C. to allow the mixture to react for 2 hours. Thereafter, the resultant oligomer was cooled to room temperature, and taken out. The oligomer was pulverized, and dried overnight under a pressure of 400 mmHg in a nitrogen gas atmosphere under heat at 100° C. The oligomer had an intrinsic viscosity [$\eta$] of 0.21 dl/g.

60 Grams of the above-obtained oligomer was charged into a 100 ml polymerization flask, and air in the flask was fully replaced with a nitrogen gas. Thereafter, while the oligomer was stirred under atmospheric pressure, the flask was kept at a temperature of 280° C. for 30 minutes to melt the oligomer. Further, while the oligomer was stirred at this temperature, the pressure inside the flask was reduced to 0.5 mmHg over 1 hour. Thereafter, while reaction water was distilled off, the oligomer was allowed to react at 280° C. for 1 hour and at 300° C. for 2 hours. The resultant polyamide was colorless and transparent, and had an intrinsic viscosity [$\eta$] of 0.92 dl/g and a glass transition temperature (Tg) of 162° C.

Table 1 shows the properties of the above-obtained polyamide.

COMPARATIVE EXAMPLE 1

An autoclave having an internal volume of 50 ml was charged with 4.98 g (30 mmol) of terephthalic acid, 11.63 g (70 mmol) of isophthalic acid, 11.97 g (103 mmol) of hexamethylenediamine, 0.02 g of sodium hypophosphite and 3.18 g of ion-exchanged water, and air in the autoclave was fully replaced with a nitrogen gas. Then, the pressure in the autoclave was adjusted to a gauge pressure of 0 kg/cm$^2$.

The autoclave was placed in a sand bath at 260° C. to allow the mixture to react for 2 hours. Thereafter, the resultant oligomer was cooled to room temperature, and taken out. The oligomer so obtained was pulverized, and dried overnight under heat at 100° C. under a pressure of 400 mmHg in a nitrogen gas atmosphere. The oligomer had an intrinsic viscosity [$\eta$] of 0.12 dl/g.

20 Grams of the above-obtained oligomer was charged into a 30 ml polymerization flask, and air in the flask was fully replaced with a nitrogen gas. Thereafter, while the oligomer was stirred under atmospheric pressure, the flask was kept at a temperature of 250° C. for 10 minutes to melt the oligomer. Further, after the temperature inside the flask was raised to 280° C., the oligomer was allowed to react at 280° C. for 30 minutes to give a pale yellowish brown, transparent polyamide.

The resultant polyamide had an intrinsic viscosity [$\eta$] of 0.88 dl/g and a glass transition temperature (Tg) of 120° C.

Table 1 shows the properties of the above-obtained polyamide.

COMPARATIVE EXAMPLE 2

An oligomer was synthesized by repeating Example 1 except for the following: TCDA was replaced with 269.1 g (1.2 mol) of a mixture of 3,8-, 4,8-, and 5,8-tricyclo[5.2.1.0$^{2,6}$]decanedicarboxylic acid, and the amounts of hexamethylenediamine, sodium hypophosphite and ion-exchanged water were respectively changed to 143,6 g (1.24 mol), 0.25 g and 46 g.

The above oligomer had an intrinsic viscosity [$\eta$] of 0.18 dl/g.

80 Grams of the above-obtained oligomer was charged into a 100 ml polymerization flask, and air in the flask was fully replaced with a nitrogen gas. Thereafter, while the oligomer was stirred under an atmospheric pressure, the flask was kept at a temperature of 260° C. for 20 minutes to melt the oligomer.

Further, the pressure in the flask was reduced to 0.3 mmHg over 1 hour, and thereafter, while reaction water was distilled off, the oligomer was allowed to react at 280° C. for 1 hour and at 300° C. for 1.5 hours to give a colorless and transparent polyamide.

The resultant polyamide has an intrinsic viscosity [η] of 0.97 dl/g and a glass transition temperature (Tg) of 145° C.

Table 1 shows the properties of the above-obtained polyamide.

TABLE 1

|  | Example | | | Comparative Example | |
| --- | --- | --- | --- | --- | --- |
|  | 1 | 2 | 3 | 1 | 2 |
| Color tone | colorless, transparent | colorless, transparent | colorless, transparent | pale yellowish brown, transparent | colorless, transparent |
| Tg (°C.) | 161 | 161 | 162 | 120 | 145 |
| [η] (dl/g) | 0.71 | 0.85 | 0.92 | 0.88 | 0.97 |
| Crystallinity (%) | 0 | 0 | 0 | 0 | 0 |
| Ethanol resistance[1] | ○ | ○ | ○ | X | X |

[1]Ethanol resistance: Immersed in ethanol at 25° C. for 8 hours
○: having resistance,
Δ: having some resistance,
X: having no resistance (melted or swollen)
(These symbols have the same meanings hereinafter.)

EXAMPLE 4

An autoclave was charged with 145.8 (0.65 mol) g of TCDA, 108.0 g (0.65 mol) of terephthalic acid, 155.6 g (1.34 mol) of hexamethylenediamine and 0.28 g of sodium hypophosphite monohydrate together with 46 g of ion exchanged water. Air in the autoclave was fully replaced with a nitrogen gas, and the pressure in the autoclave was adjusted to a gauge pressure of 0 kg/cm². While the mixture was stirred, the mixture was heated such that the temperature of the resultant reaction mixture became 250° C. over 2 hours. The reaction mixture was further stirred at this temperature for 1 hour.

Then, the stirring was stopped, and the reaction mixture was drawn from the autoclave bottom at a pressure difference of 10 kg/cm².

The reaction mixture was found to be an oligomer composed from TCDA, terephthalic acid and hexamethylenediamine.

The above-obtained oligomer was dried overnight under a pressure of 400 mmHg in a nitrogen gas atmosphere under heat at 100° C. The dried oligomer was measured for an intrinsic viscosity [η] to show 0.15 dl/g.

EXAMPLE 5

The oligomer obtained in Example 4 was fed to a twin-screw extruder (screw diameter 30 mm, L/D=42, a barrel temperatures (° C.)=130/250/320/320/320/320/300/300/300, vents open to atmosphere in 2nd, 4th and 6th zones, rotation rate 40 rpm, evacuation=purging with nitrogen) at a feed rate of 1.5 kg/h to polymerize the oligomer in a molten state, whereby a colorless and transparent copolyamide was obtained.

The copolyamide had an intrinsic viscosity [η] of 0.81 dl/g and a glass transition temperature (Tg), measured with DSC, of 150° C.

Tables 2 and 3 show the results.

EXAMPLE 6

The oligomer obtained in Example 4 was polymerized in a molten state in the same manner as in Example 5 except that the barrel temperatures (° C.) were changed to 180/280/350/350/340/340/290/290, whereby a colorless and transparent copolyamide was obtained.

The copolyamide had an intrinsic viscosity [η] of 1.06 dl/g and a glass transition temperature (Tg), measured with DSC, of 149° C.

Table 2 shows the results.

EXAMPLE 7

A 100 ml polymerization flask was charged with 60 g of the oligomer obtained in Example 4, and air in the flask was fully replaced with a nitrogen gas. Then, the oligomer was polymerized in a nitrogen gas current at 280° C. for 30 minutes to give a colorless and transparent copolyamide.

The copolyamide had an intrinsic viscosity [η] of 1.21 dl/g and a glass transition temperature (Tg), measured with DSC, of 151° C.

Table 2 shows the results.

EXAMPLE 8

Example 4 was repeated except that the starting materials were changed to 125.6 g (0.56 mol) of TCDA, 139.6 g (0.84 mol) of terephthalic acid, 167.6 g (1.44 mol) of hexamethylenediamine, 0.3 g of sodium hypophosphite monohydrate and 48 ml of ion-exchanged water, whereby an oligomer was obtained.

The oligomer had an intrinsic viscosity [η] of 0.16 dl/g.

Further, the oligomer was polymerized in the same manner as in Example 6 to give a colorless and transparent copolyamide.

The copolyamide had an intrinsic viscosity [η] of 0.86 dl/g and a glass transition temperature (Tg), measured with DSC, of 146° C.

Table 2 and 3 show the results.

COMPARATIVE EXAMPLE 3

A 500 ml flask was charged with 77.7 g (0.40 mol) of dimethyl terephthalate, 77.7 g (0.40 mol) of dimethyl isophthalate, 95.8 g (0.824 mol) of hexaethylenediamine and 0.16 g of phosphoric acid as a catalyst together with 22 g of ion-exchanged water.

While the resultant mixture was stirred under a nitrogen atmosphere at an atmospheric pressure, the mixture was heated at 95° C. for 2 hours, at 130° C. for 3 hours and at 140° C. for 4 hours to give a white nylon salt.

The above nylon slat was charged into a polymerization flask, and under a nitrogen atmosphere at an atmospheric pressure, the nylon salt was heated at 130° C. for 1 hour, at 140° C. for 1 hour and at 150° C. for 1 hour.

While the distillate was removed, the temperature of the reaction product was raised up to 200° C. over 2 hours, and up to 300° C. over 4 hours, and the reaction product was heated at 300° C. for 15 minutes to terminate the reaction.

The resultant polymer was pale yellowish brown and transparent, and had an intrinsic viscosity [η] of 1.10 dl/g and a glass transition temperature (Tg) of 126° C.

Table 2 shows the results.

The results in Table 2 show that the copolyamides of the present invention have strength equivalent to or higher than that of copolyamides composed from aromatic dicarboxylic acids alone, and also that the copolyamides of the present invention have a higher glass transition temperature or excellent heat resistance than/over copolyamide composed from aromatic dicarboxylic acid alone.

Further, Table 3 shows that the copolyamide of the present invention is excellent in resistance to chemicals such as ethanol, chloroform, acetic acid, etc., and also excellent in boiling water resistance.

TABLE 2

|  | Ex. 5 | Ex. 6 | Ex. 7 | Ex. 8 | CEx. 3 |
|---|---|---|---|---|---|
| Dicarboxylic acids | TCDA/TA | TCDA/TA | TCDA/TA | TCDA/TA | IA/TA |
| Mixing ratio | 50/50 | 50/50 | 50/50 | 40/60 | 50/50 |
| [η] (dl/g) | 0.81 | 1.06 | 1.20 | 0.86 | 1.10 |
| Tg (°C.) | 150 | 149 | 151 | 146 | 126 |
| FS (kg/cm$^2$) | 1,358 | 1,405 | 1,558 | 1,543 | 1,400 |
| FM (kg/cm$^2$) | 21.6 × 10$^3$ | 20.5 × 10$^3$ | 21.3 × 10$^3$ | 24.9 × 10$^3$ | 42.0 × 10$^3$ |
| Izod (kg · cm/cm) | 5.1 | 5.5 | 6.5 | 4.4 | 3.1 |
| Xc (%) | 0 | 0 | 0 | 0 | 5 |

TABLE 3

|  | Dicarboxylic acids | Mixing ratio | Chemical resistance[1] | | | | Boiling water resistance[2] |
|---|---|---|---|---|---|---|---|
|  |  |  | Acetone | Ethanol | CHCl$_3$ | Acetic acid |  |
| Ex. 5 | TCDA/TA | 50/50 | ○ | ○ | ○ | Δ | ○ |
| Ex. 8 | TCDA/TA | 40/60 | ○ | ○ | ○ | ○ | ○ |
| CEx. 3 | IA/TA | 50/50 | ○ | X | Δ | X | X |

[1] A 2 mm thick test piece was immersed at 23° C. for 8 days. ○: No change, Δ: Slightly changed, X: Melted or swollen

[2] A 2 mm thick test piece was immersed in boiling water for 5 hours. ○: Not whitened, Δ: Slightly whitened, X: Whitened

EXAMPLE 9

An autoclave was charged with 134.56 g (0.6 mol) of 3,5-tricyclo[5,2,1,0$^{2,6}$]decanedicarboxylic acid (TCDA), 99.68 g (0.6 mol) of isophthalic acid, 143.64 g (1.24 mol) of hexamethylenediamine and 0.25 g of sodium hypophosphite monohydrate together with 42 g of ion-exchanged water. Air in the autoclave was fully replaced with a nitrogen gas, and then, the pressure in the autoclave was adjusted to a gauge pressure of 0 kg/cm$^2$. While the mixture was stirred, the mixture was heated such that the temperature of the resultant reaction solution became 250° C. over 2 hours, and the reaction mixture was further stirred at this temperature for 1 hour.

Then, the stirring was stopped, and the reaction mixture was drawn from the autoclave bottom at a pressure difference of 10 kg/cm$^2$.

The reaction mixture was found to be an oligomer composed from TCDA, isophthalic acid and hexamethylenediamine.

The above-obtained oligomer was dried overnight under a pressure of 400 mmHg in a nitrogen gas atmosphere under heat at 100° C. The dried oligomer was measured for an intrinsic viscosity [η] to show 0.13 dl/g.

EXAMPLE 10

A 100 ml polymerization flask was charged with 60 g of the oligomer obtained in Example 9, and air in the flask was fully replaced with a nitrogen gas. The flask was kept at 250° C. for 10 minutes under a nitrogen gas current to melt the oligomer, and further, allowed to react at an atmospheric pressure at 250° C. for 1 hour while reaction water formed was removed, whereby a colorless and transparent copolyamide was obtained.

The above-obtained copolyamide had an intrinsic viscosity [η] of 1.27 dl/g and a glass transition temperature (Tg), measured with DSC, of 143° C.

Table 4 shows the results.

EXAMPLE 11

Example 9 was repeated except that the starting materials were changed to 100.9 g (0.45 mol) of TCDA, 174.4 g (1.05 mol) of isophthalic acid, 179.5 g (1.55 mol) of hexamethylenediamine, 0.32 g of sodium hypophosphite monohydrate and 51 ml of ion-exchanged water, whereby an oligomer was obtained.

The oligomer had an intrinsic viscosity [η] of 0.14 dl/g.

A 100 ml polymerization flask was charged with 60 g of the above oligomer, and air in the flask was fully replaced with a nitrogen gas. In a nitrogen gas current, the flask was kept at 250° C. for 10 minutes to melt the oligomer, and while reaction water was distilled off, the oligomer was allowed to react at an atmospheric pressure at 250° C. for 40 minutes, at a reduced pressure of 100 torr at 280° C. for 30 minutes to give a colorless and transparent copolyamide.

The above-obtained copolyamide had an intrinsic viscosity [η] of 0.90 dl/g and a glass transition temperature (Tg), measured with DSC, of 130° C.

Table 4 shows the results.

EXAMPLE 12

Example 9 was repeated except that the starting materials were changed to 125.6 g (0.56 mol) of TCDA, 69.8 g (0.42 mol) of isophthalic acid, 69.8 g (0.42 mol) of terephthalic acid, 167.6 g (1.44 mol) of hexamethylenediamine, 0.3 g of sodium hypophosphite monohydrate and 48 ml of ion-exchanged water, whereby an oligomer was obtained.

The oligomer had an intrinsic viscosity [η] of 0.14 dl/g.

A 100 ml polymerization flask was charged with 60 g of the above oligomer, and air in the flask was fully replaced with a nitrogen gas. In a nitrogen gas current, the flask was kept at 260° C. for 10 minutes to melt the oligomer, and while reaction water was distilled off, the oligomer was allowed to react at an atmospheric pressure at 280° C. for 1 hour to give a colorless and transparent copolyamide.

The above-obtained copolyamide had an intrinsic viscosity [η] of 0.93 dl/g and a glass transition temperature (Tg), measured with DSC, of 138° C.

Table 4 shows the results.

COMPARATIVE EXAMPLE 4

A 500 ml flask was charged with 155.4 g (0.8 mol) of dimethyl isophthalate, 95.8 g (1.824 mol) of hexamethylenediamine and 0.16 g of phosphoric acid as a catalyst together with 22 g of ion-exchanged water.

While the resultant mixture was stirred under a nitrogen atmosphere at an atmospheric pressure, the mixture was heated at 95° C. for 2 hours, at 130° C. for 3 hours and at 140° C. for 4 hours to give a white nylon salt.

The above nylon salt was charged into a polymerization flask, and while the nylon salt was stirred under a nitrogen atmosphere at an atmospheric pressure, the nylon salt was heated at 130° C. for 1 hour, at 140° C. for 1 hour and at 150° C. for 1 hour.

Further, while a distillate was removed, the temperature of the reaction product was raised up to 200° C. over 2 hours, and then up to 300° C. over 4 hours, and the reaction product was heated at 300° C. for 15 minutes to finish the reaction.

The resultant polymer was pale yellowish brown and transparent, and had an intrinsic viscosity [η] of 1.20 dl/g and a glass transition temperature (Tg) of 120° C.

The results in Table 4 clearly show that the copolyamides of the present invention have a higher glass transition temperature of is excellent in heat resistance than/or polyamide composed from aromatic dicarboxylic acid alone.

TABLE 4

| | Ex. 10 | Ex. 11 | Ex. 12 | CEx. 4 |
|---|---|---|---|---|
| Dicarboxylic acids | TCDA/IA | TCDA/IA | TCDA/IA/TA | IA |
| Mixing ratio | 50/50 | 30/70 | 40/30/30 | — |
| [η] (dl/g) | 1.27 | 0.90 | 0.93 | 1.20 |
| Tg (°C.) | 143 | 130 | 138 | 120 |
| FS (kg/cm$^2$) | 1,667 | 1,590 | 1,458 | 1,730 |
| FM (kg/cm$^2$) | 25.0 × 10$^3$ | 22.0 × 10$^3$ | 18.4 × 10$^3$ | 35.4 × 10$^3$ |
| Izod (kg · cm/cm) | 4.5 | 6.2 | 5.7 | 3.1 |
| Xc (%) | 0 | 0 | 0 | 0 |

EXAMPLE 13

Example 9 was repeated except that the starting materials were changed to 134.6 g (0.6 mol) of TCDA, 87.7 g (0.6 mol) of adipic acid, 143.6 g (1.24 mol) of hexamethylenediamine, 0.25 g of sodium hypophosphite monohydrate and 41 ml of ion-exchanged water, whereby an oligomer was obtained. The oligomer had an intrinsic viscosity [η] of 0.22 dl/g.

The above-obtained oligomer was charged into a 100 ml polymerization flask, and air in the flask was fully replaced with a nitrogen gas. The flask was kept under a nitrogen gas current at 250° C. for 20 minutes to melt the oligomer, and the pressure in the flask was decreased to 0.7 torr over 10 minutes. While reaction water was distilled off, the oligomer was allowed to react at 250° C. for 0.5 hour, at 260° C. for 1 hour and at 270° C. for 2.5 hour to give a colorless and transparent copolyamide. This copolyamide had an intrinsic viscosity [η] of 1.54 dl/g and a glass transition temperature (Tg), measured with DSC, of 100° C.

EXAMPLE 14

A 50 ml autoclave was charged with 13.46 g (60 mmol) of TCDA, 5.39 g (46 mmol) of hexamethylenediamine, 3.25 g (15.5 mmol) of 4,4'-methylenebis(cyclohexylamine), 0.01 of sodium hypophosphite monohydrate and 2.46 g of ion-exchanged water, and air in the autoclave was fully replaced with a nitrogen gas. Then, the pressure in the autoclave was adjusted to a gauge pressure of 0 kg/cm$^2$.

The above autoclave was placed in a sand bath at 260° C. to react the mixture for 2 hours, and the reaction mixture was cooled to room temperature and taken out. The resultant oligomer was pulverized, and dried overnight under a pressure of 400 mmHg under a nitrogen gas atmosphere under heat at 100° C. The dried oligmer was measured for a intrinsic viscosity [η] to show 0.06 dl/g.

EXAMPLE 15

A 30 ml polymerization flask was charged with 8 g of an oligomer which had been prepared in the same manner as in Example 14, and air in the flask was fully replaced with nitrogen. Thereafter, while the oligomer was stirred at an atmospheric pressure, the flask was kept at 250° C. for 10 minutes to melt the oligomer. Further, the temperature of the oligomer was raised to 280° C. over 1 hour, and further, the oligomer was allowed to react while the pressure in the flask was reduced to 2 mmHg at this temperature over 1 hour, whereby a colorless and transparent polyamide was obtained.

The above-obtained polyamide had an intrinsic viscosity [η] of 0.70 dl/g and a glass transition temperature (Tg) of 182° C.

EXAMPLE 16

Example 14 was repeated except that the starting materials were changed to 15.7 g (70 mmol) of TCDA, 6.28 g (54 mmol) of hexamethylenediamine, 2.56 g (18 mmol) of 1,3-bis(aminomethyl)cyclohexane, 0.02 g of sodium hypophosphite monohydrate and 2.73 g of ion-exchanged water, whereby an oligomer was obtained. The oligomer had an intrinsic viscosity [η] of 0.19 dl/g.

A 30 ml polymerization flask was charged with 8 g of the above-obtained oligomer, and air was fully replaced with nitrogen. Thereafter, while the oligomer was stirred at an atmospheric pressure, the flask was kept at 280° C. for 10 minutes to melt the oligomer. Further, the pressure in the flask was reduced to 5 mmHg over 10 minutes, and then the oligomer was allowed to react at 280° C. for 30 minutes and at 300° C. for 30 minutes to give a colorless and transparent polyamide.

The above-obtained polyamide had an intrinsic viscosity [η] of 0.82 dl/g and a glass transition temperature (Tg) of 180° C.

EXAMPLE 17

Example 14 was repeated except that the starting materials were changed to 15.7 g (70 mmol) of TCDA, 6.28 g (54 mmol) of hexamethylenediamine, 3.50 g (18 mmol) of a mixture of 3,8-, 4,8- and 5,8-bis(aminomethyl)tricyclo-[5.2.1.0$^{2,6}$]decane, 0.02 g of sodium hypophosphite monohydrate and 2.83 g of ion-exchanged water, whereby an oligomer was obtained. The oligomer had an intrinsic viscosity [η] of 0.18 dl/g.

A 30 ml polymerization flask was charged with 8 g of the above-obtained oligomer, and air was fully replaced with nitrogen. Thereafter, while the oligomer was stirred at an atmospheric pressure, the flask was kept at 280° C. for 10 minutes to melt the oligomer. Further, the oligomer was allowed to react at 280° C. for 30 minutes, and after the pressure in the flask was reduced to 10 mmHg, and then the reaction product was allowed to react at 300° C. for 40 minutes to give a colorless and transparent polyamide.

The above-obtained polyamide had an intrinsic viscosity [η] of 1.01 dl/g and a glass transition temperature (Tg) of 183° C.

EXAMPLE 18

A 50 ml autoclave was charged with 7.85 g (35 mmol) of TCDA, 6.03 g (35 mmol) of 1,4-cyclohexanedicarboxylic acid, 8.38 g (72 mmol) of hexamethylenediamine, 0.02 g of sodium hypophosphite monohydrate and 2.48 g of ion-exchanged water, and after air in the autoclave was fully replaced with a nitrogen gas, the pressure in the autoclave was adjusted to a gauge pressure of 0 kg/cm$^2$.

The above autoclave was placed in a sand bath at 260° C. to react the mixture for 2 hours, and then, the resultant oligomer was cooled to room temperature and taken out. The oligomer was pulverized, and dried overnight under a pressure of 400 mmHg under a nitrogen gas atmosphere under heat at 100° C. The dried oligomer was measured for an intrinsic viscosity [η] to show 0.22 dl/g.

A 30 ml polymerization flask was charged with 8 g of the above-obtained oligomer, and air in the flask was fully replaced with nitrogen. While the oligomer was stirred at an atmospheric pressure, the flask was kept at 280° C. for 10 minutes to melt the oligomer. Further, the oligomer was allowed to react at 280° C. for 30 minutes while the pressure in the flask was reduced to 10 mmHg, and the oligomer was allowed to react at 300° C. for 1 hour to give a colorless and transparent polyamide.

The above-obtained polyamide had an intrinsic viscosity [η] of 0.58 dl/g and a glass transition temperature (Tg) of 138° C.

EXAMPLE 19

Example 14 was repeated except that 4,4'-methylenebis(cyclohexylamine) was replaced with 1.95 g (18 mmol) of p-phenylenediamine, and that the amounts of TCDA, HMDA, sodium hypophosphite monohydrate and ion-exchanged water were respectively changed to 15.70 g (70 mmol), 6.29 g (54 mmol), 0.02 g and 2.66 g, whereby an oligomer was obtained. The oligomer had an intrinsic viscosity [η] of 0.11 dl/g.

8 Grams of the above-obtained oligomer was charged into a 30 ml polymerization flask, and air in the flask was fully replaced with a nitrogen gas. Thereafter, while the oligomer was stirred at an atmospheric pressure, the flask was kept at 250° C. for 5 minutes to melt the oligomer.

Further, the pressure in the flask was reduced to 10 mmHg at the above temperature over 1 hour, and then the temperature inside the flask was raised to 280° C. The oligomer was allowed to react at 280° C. for 1 hour and at 300° C. for 1 hour to give a colorless and transparent polyamide.

The above-obtained polyamide had an intrinsic viscosity [η] of 0.37 dl/g and a glass transition temperature (Tg) of 178° C.

EXAMPLE 20

Example 14 was repeated except that 4,4'-methylenebis(cyclohexylamine) was replaced with 2.45 g (18 mmol) of m-xylenediamine, and that the amounts of TCDA, HMDA, sodium hypophosphite monohydrate and ion-exchanged water were respectively changed to 15.70 g (70 mmol), 6.29 g (54 mmol), 0.02 g and 2.72 g, whereby an oligomer was obtained. The oligomer had an intrinsic viscosity [η] of 0.17 dl/g.

8 Grams of the above-obtained oligomer was charged into a 30 ml polymerization flask, and air in the flask was fully replaced with a nitrogen gas. Thereafter, while the oligomer was stirred at an atmospheric pressure, the flask was kept at 250° C. for 5 minutes to melt the oligomer. Then, the temperature inside the flask was raised to 280° C., and the oligomer was allowed to react at 280° C. for 30 minutes. Thereafter, the pressure in the flask was reduced to 10 mmHg over 30 minutes. The temperature inside the flask was raised to 300° C., and the oligomer was allowed to react for 30 minutes to give a colorless and transparent polyamide.

The above-obtained polyamide had an intrinsic viscosity [η] of 1.28 dl/g and a glass transition temperature (Tg) of 171° C.

What is claimed is:

1. A polyamide comprising a recurring unit of the formula (I),

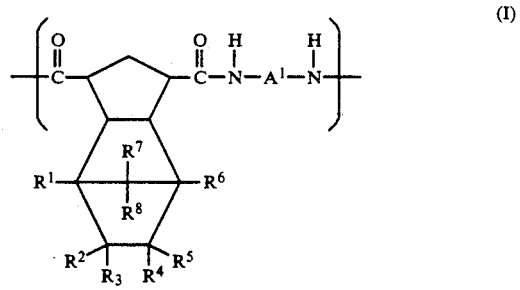

wherein each of $R^1$, $R^2$, $R^3$, $R^4$, $R^5$, $R^6$, $R^7$ and $R^8$ is independently a hydrogen atom, a halogen atom, a hydroxyl group, an alkyl group, a halogen-containing alkyl group, a hetero-atom-containing alkyl group, or an unsubstituted or substituted aromatic hydrocarbon group wherein said substituent is selected from the group consisting of alkyl group, halogen atom, —CN group, —NO$_2$ group, acyl group and alkoxy group and $A^1$ is a divalent hydrocarbon group.

2. The polyamide of claim 1, which mainly comprises the recurring unit of the formula (I).

3. The polyamide of claim 1, which substantially consists of the recurring unit of the formula (I).

4. A copolyamide which mainly comprises a recurring unit of the formula (I),

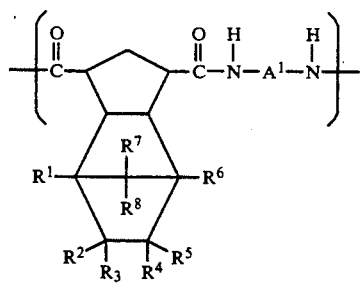

wherein each of $R^1$, $R^2$, $R^3$, $R^4$, $R^5$, $R^6$, $R^7$ and $R^8$ is independently a hydrogen atom, a halogen atom, a hydroxyl group, an alkyl group, a halogen-containing alkyl group or a hetero-atom-containing alkyl group, or an unsubstituted or substituted aromatic hydrocarbon group wherein said substituent is selected from the group consisting of alkyl group, halogen atom, —CN group, —NO$_2$ group, acyl group and alkoxy group, and $A^1$ is a divalent hydrocarbon group, and a recurring unit of the formula (II),

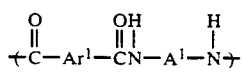

wherein $Ar^1$ is a divalent aromatic group selected from the group consisting of

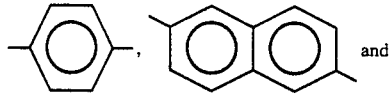

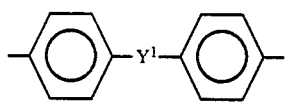

in which $Y^1$ is —CH$_2$, —O—, —SO$_2$— or —CO— and $A^1$ is a divalent hydrocarbon group, the amount of the recurring unit of the formula (I) being 99 to 40 mol % based on the total amount of the recurring units of the formulae (I) and (II), the amount of the recurring unit of the formula (II) being 1 to 60 mol % based on the total amount of the recurring units of the formulae (I) and (II).

5. The polyamide of claim 4, which substantially consists of the recurring unit of the formula (I) and the recurring unit of the formula (II).

6. A copolyamide which mainly comprises a recurring unit of the formula (I),

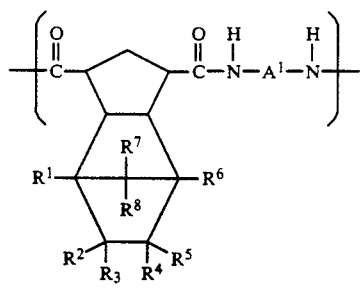

wherein each of $R^1$, $R^2$, $R^3$, $R^4$, $R^5$, $R^6$, $R^7$ and $R^8$ is independently a hydrogen atom, a halogen atom, a hydroxyl group, an alkyl group, a halogen-atom-containing alkyl group, a hetero-atom-containing alkyl group, or an unsubstituted or substituted aromatic hydrocarbon group wherein said substituent is selected from the group consisting of alkyl group, halogen atom, —CN group, —NO$_2$ group, acyl group and alkoxy group, and $A^1$ is a divalent hydrocarbon group, and a recurring unit of the formula (III),

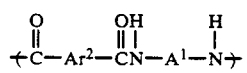

wherein $Ar^2$ is a divalent aromatic group selected from the group consisting of

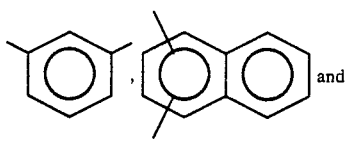

excluding 2,6-naphthylene, and

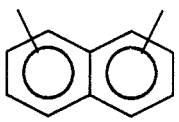

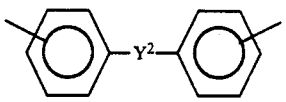

excluding a 4,4'-form, in which $Y^2$ is —CH$_2$—, —O—, —SO$_2$— or —CO—, and $A^1$ is a divalent hydrocarbon group, the amount of the recurring unit of the formula (I) being 99 to 1 mol % based on the total amount of the recurring units of the formulae (I) and (III), the amount of the recurring unit of the formula (III) being 1 to 99 mol % based on the total amount of the recurring units of the formulae (I) and (III).

7. The copolyamide of claim 6, which mainly comprises the recurring unit of the formula (I) and the recurring unit of the formula (III) and further contains less than 50 mol %, based on the total recurring units, of the recurring unit of the formula (II),

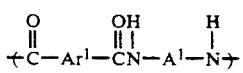 (II)

wherein $Ar^2$ is a divalent aromatic group selected from the group consisting of

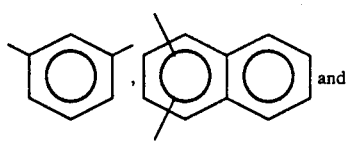 and

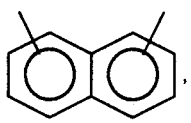, excluding 2,6-naphthylene.

8. The copolyamide of claim 6, which substantially consists of the recurring unit of the formula (I) and the recurring unit of the formula (III).

9. A process for the production of a polyamide comprising the recurring unit of the formula (I) as set forth in claim 1, which comprises subjecting to a polycondensation reaction a dicarboxylic acid comprising an alicyclic dicarboxylic acid of the formula (a)-1,

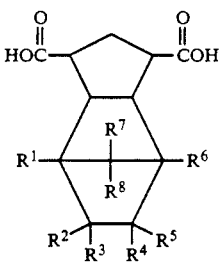 (a)-1 wherein $R^1$, $R^2$, $R^3$, $R^4$, $R^5$, $R^6$, $R^7$ and $R^8$ are as defined in the formula (I), and a diamine of the formula (b)-1,

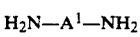 (b)-1 wherein $A^1$ is as defined in the formula (I).

10. The process of claim 9, wherein the dicarboxylic acid mainly comprises the alicyclic dicarboxylic acid of the formula (a)-1.

11. The process of claim 9, wherein the dicarboxylic acid substantially consists of the alicyclic dicarboxylic acid of the formula (a)-1.

12. A process for the production of a copolyamide mainly comprising the recurring unit of the formula (I) and the recurring unit of the formula (II) as set forth in claim 4, which comprises subjecting to a polycondensation reaction a dicarboxylic acid mainly comprising an alicyclic dicarboxylic acid of the formula (a)-1,

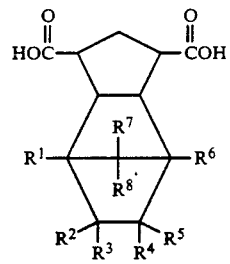 (a)-1 wherein $R^1$, $R^2$, $R^3$, $R^4$, $R^5$, $R^6$, $R^7$ and $R^8$ are as defined in formula (I), and a first aromatic dicarboxylic acid of the formula (a)-2,

 (a)-2 wherein $Ar^1$ is as defined in the formula (II) and a diamine of the formula (b)-1,ps
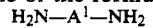 (b)-1 wherein $A^1$ is as defined in the formula (I).

13. The process of claim 12, wherein the dicarboxylic acid substantially consists of the alicyclic dicarboxylic acid of the formula (a)-1 and the first aromatic dicarboxylic acid of the formula (a)-2.

14. A process for the production of a copolyamide of claim 6 mainly comprising the recurring unit of the formula (I) and the recurring unit of the formula (III), which comprises subjecting to a polycondensation reaction a dicarboxylic acid mainly comprising an alicyclic dicarboxylic acid of formula (a)-1,

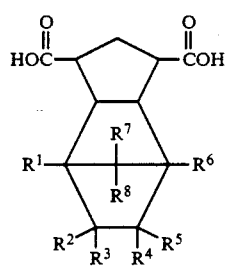 (a)-1 wherein $R^1$, $R^2$, $R^3$, $R^4$, $R^5$, $R^6$, $R^7$ and $R^8$ are as defined in the formula (I), and a second aromatic dicarboxylic acid of formula (a)-3,

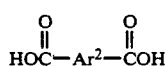 (a)-3 wherein $Ar^2$ is as defined in the formula (III), and a diamine of the formula (b)-1,

 (b)-1 wherein $A^1$ is as defined in the formula (I).

15. The process of claim 14, wherein the dicarboxylic acid further contains less than 50 mol %, based on a total dicarboxylic acid amount, of the first aromatic dicarboxylic acid.

16. The process of claim 14, wherein the dicarboxylic acid substantially consists of the alicyclic dicarboxylic acid of the formula (a)-1 and the second aromatic dicarboxylic acid of the formula (a)-3.

17. The polyamide of claim 1 wherein in the definition of groups $R^1$ to $R^8$ said aromatic hydrocarbon group has 6 to 20 carbon atoms and said alkyl group has 1 to 20 carbon atoms.

18. The polyamide of claim 17 wherein said aromatic hydrocarbon group is phenyl, totyl, xylyl, mesityl, benzyl, idenyl or anisoyl.

19. The polyamide of claim 1 wherein said hetero atom in said hetero-atom-containing alkyl group is selected from the group consisting of oxygen, nitrogen and sulfur atoms, and wherein said halogen atom in said halogen-atom-substituted aromatic hydrocarbon group or in said halogen-atom-containing alkyl group is selected from the group consisting of fluorine, chlorine, bromine and iodine atoms.

20. The polyamide of claim 17 wherein said hetero-atom-containing alkyl group is an alkoxy group, an alkoxycarbonyl group, or an acyl group.

21. The polyamide of claim 17 wherein said halogen-containing alkyl group is a perfluoroalkyl group.

22. The copolyamide of claim 4, wherein in the definition of the groups $R^1$ to $R^8$ said substituted or unsubstituted aromatic hydrocarbon group has 6 to 20 carbon atoms, and said alkyl group, halogen-containing alkyl group or hetero-atom-containing alkyl group each has 1 to 20 carbon atoms.

23. The copolyamide of claim 22 wherein said substituted or unsubstituted aromatic hydrocarbon group is selected from the group consisting of phenyl, tolyl, xylyl, mesityl, benzyl, indenyl and anisoyl groups.

24. The copolyamide of claim 6, wherein in the definition of the group $R^1$ to $R^8$ said substituted or unsubstituted aromatic hydrocarbon group has 6 to 20 carbon atoms, and said alkyl group, halogen-containing alkyl group, or hetero-atom-containing alkyl group each has 1 to 20 carbon atoms.

25. The copolyamide of claim 24 wherein said substituted or unsubstituted aromatic hydrocarbon group is selected from the group consisting of phenyl, tolyl, xylyl, mesityl, benzyl, indenyl and anisoyl groups.

26. The copolyamide of claim 4 wherein said hetero-atom in said hetero-atom-containing alkyl group is selected from the group consisting of oxygen, nitrogen and sulfur atoms, and said halogen-atom in said halogen-atom-substituted aromatic hydrocarbon group or in said halogen-atom-containing alkyl group is selected from the group consisting of fluorine, chlorine, bromine and iodine atoms.

27. The copolyamide of claim 6 wherein said hetero-atom in said hetero-atom-containing alkyl group is selected from the group consisting of oxygen, nitrogen and sulfur atoms, and said halogen-atom in said halogen-atom-substituted aromatic hydrocarbon group or in said halogen-atom-containing alkyl group is selected from the group consisting of fluorine, chlorine, bromine and iodine atoms.

28. The copolyamide of claim 22 wherein said hetero-atom-containing alkyl group is an alkoxy group, alkoxycarbonyl group or an acyl group.

29. The copolyamide of claim 24 wherein said hetero-atom-containing alkyl group is an alkoxy group, alkoxycarbonyl group or an acyl group.

30. The copolyamide of claim 22 wherein said halogen-atom-containing alkyl group is a perfluoroalkyl group.

31. The copolyamide of claim 24 wherein said halogen-atom-containing alkyl group is a perfluoroalkyl group.

32. The copolyamide of claim 1 which has an intrinsic viscosity ($\eta$), as measured in concentrated sulfuric acid at 30° C., in the range of from 0.4 to 4.0 dl/g and a glass transition temperature (Tg) in the range of from 50° to 300° C.

33. The copolyamide of claim 1 which has an intrinsic viscosity ($\eta$), as measured in concentrated sulfuric acid at 30° C., in the range of from 0.6 to 3.0 dl/g and a glass transition temperature (Tg) in the range of from 100° to 250° C.

34. The copolyamide of claim 4 which has an intrinsic viscosity ($\eta$), as measured in concentrated sulfuric acid at 30° C., in the range of from 0.4 to 4.0 dl/g and a glass transition temperature (Tg) in the range of from 50° to 300° C.

35. The copolyamide of claim 4 which has an intrinsic viscosity ($\eta$), as measured in concentrated sulfuric acid at 30° C., in the range of from 0.6 to 3.0 dl/g and a glass transition temperature (Tg) in the range of from 100° to 250° C.

36. The copolyamide of claim 6 which has an intrinsic viscosity ($\eta$), as measured in concentrated sulfuric acid at 30° C., in the range of from 0.4 to 4.0 dl/g and a glass transition temperature (Tg) in the range of from 50° to 300° C.

37. The copolyamide of claim 6 which has an intrinsic viscosity ($\eta$), as measured in concentrated sulfuric acid at 30° C., in the range of from 0.6 to 3.0 dl/g and a glass transition temperature (Tg) in the range of from 100° to 250° C.

38. The polyamide of claim 1 wherein the divalent hydrocarbon group $A^1$ is an aliphatic hydrocarbon group having from 1 to 25 carbon atoms, an alicyclic hydrocarbon group having 3 to 25 carbon atom rings members, or an aromatic hydrocarbon group having 6 to 25 carbon atom ring members.

39. The polyamide of claim 1 wherein the divalent hydrocarbon group $A^1$ is an aliphatic hydrocarbon group having from 4 to 18 carbon atoms, an alicyclic hydrocarbon group having 3 to 15 carbon atom rings members, or an aromatic hydrocarbon group having 6 to 20 carbon atom ring members.

40. The polyamide of claim 4 wherein the divalent hydrocarbon group $A^1$ is an aliphatic hydrocarbon group having from 1 to 25 carbon atoms, an alicyclic hydrocarbon group having 3 to 25 carbon atom rings members, or an aromatic hydrocarbon group having 6 to 25 carbon atom ring members.

41. The polyamide of claim 6 wherein the divalent hydrocarbon group $A^1$ is an aliphatic hydrocarbon group having from 4 to 18 carbon atoms, an alicyclic hydrocarbon group having 3 to 15 carbon atom rings members, or an aromatic hydrocarbon group having 6 to 20 carbon atom ring members.

42. The copolyamide of claim 4 which contains from 80 to 40 mol % of recurring units of formula (I) and from 20 to 60 mol % of recurring units of formula (II).

43. The copolyamide of claim 6 which comprises from 80 to 30 mol % of recurring units of formula (I) and from 20 to 70 mol % of recurring units of formula (III).

44. The polyamide of claim 1 which is the polyamide polycondensation product of 3,5-tricyclo[5.2.1.0$^{2,6}$]-decanedicarboxylic acid and hexamethylenediamine.

45. The polyamide of claim 1 which is the polyamide polycondensation reaction product of an alicyclic dicarboxylic acid selected from the group consisting of
tetracyclo[4.4.0.1$^{2,5}$,1$^{7,10}$]-3-dodecene,
8-methyltetracyclo[4.4.0.1$^{2,5}$,1$^{7,10}$]-3-dodecene,
8-ethyltetracyclo[4.4.0.1$^{2,5}$,1$^{7,10}$]-3-dodecene,
8-propyltetracyclo[4.4.0.1$^{2,5}$,1$^{7,10}$]-3-dodecene,
8-hexyltetracyclo[4.4.0.1$^{2,5}$,1$^{7,10}$]-3-dodecene,
8-stearyltatracyclo[4.4.0.1$^{2,5}$,1$^{7,10}$]-3-dodecene,
8,9-dimethyltetracyclo[4.4.0.1$^{2,5}$,1$^{7,10}$]-3-dodecene,
8-ethyl-9-methyltetracyclo[4.4.0.1$^{2,5}$,1$^{7,10}$]-3-dodecene,
8-chlorotetracyclo[4.4.0.1$^{2,5}$,1$^{7,10}$]-3-dodecene,
8-bromotetracyclo[4.4.0.1$^{2,5}$,1$^{7,10}$]-3-dodecene,
8-fluorotetracyclo[4.4.0.1$^{2,5}$,1$^{7,10}$]-3-dodecene,
8,9-dichlorotetracyclo[4.4.0.1$^{2,5}$,1$^{7,10}$]-3-dodecene,
8-cyclohexyltetracyclo[4.4.0.1$^{2,5}$,1$^{7,10}$]-3-dodecene,
8-isobutyltetracyclo[4.4.0.1$^{2,5}$,1$^{7,10}$]-3-dodecene,
8-butyltetracyclo[4.4.0.1$^{2,5}$,1$^{7,10}$]-3-dodecene,
8-cyanotetracyclo[4.4.0.1$^{2,5}$,1$^{7,10}$]-3-dodecene,
8-acetoxytetracyclo[4.4.0.1$^{2,5}$,1$^{7,10}$]-3-dodecene,
8-methoxytetracyclo[4.4.0.1$^{2,5}$,1$^{7,10}$]-3-dodecene,
8-phenyltetracyclo[4.4.0.1$^{2,5}$,1$^{7,10}$]-3-dodecene, and
8,8,9-trifluoro-9-trifluoromethyl-tetracyclo[4.4.0.1$^{2,5}$,1$^{7,10}$]-3-dodecene, and
a divalent aliphatic, alicyclic or aromatic diamine selected from the group consisting of tetramethylenediamine, hexamethylenediamine, octamethylenediamine, decamethylenediamine, dodecamethylenediamine, 2,2,4-trimethylhexamethyl-diamine, 2,4,4-trimethylhexamethyldiamine, dimethyloctamethylenediamine, 4,4'-methylenebis(aminocyclohexyl); bis(4-aminocyclohexyl)propane; 4,4'-diamino-3,3'-dimethylcyclohexylmethane; isophoronediamine; piperazine; cyclopropanediamine of the formula (b)-11,

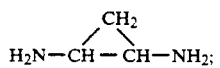
(b)-11 cyclopropyldimethyleneamine of the formula (b)-12,

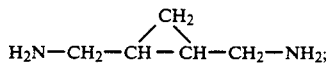
(b)-12 cyclohexanediamine of the formula (b)-13,

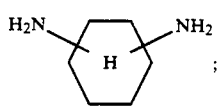
(b)-13 cyclohexanedimethyleneamine of the formula (b)-14,

(b)-14 bicyclo[2.2.1]hept-2-ene of the formula (b)-15,

(b)-15 diamines of any one of the above formulae (b)-11 to (b)-15 in which the alicyclic ring moiety has an alkyl group having 1 to 4 carbon atoms as a substituent; diamine of the formula (b)-16,

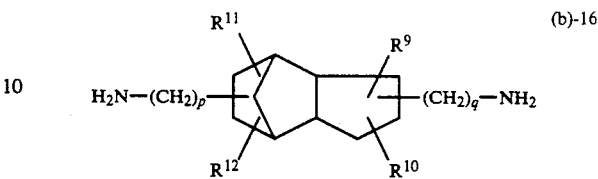
(b)-16 wherein each of R$^9$, R$^{10}$, R$^{11}$ and R$^{12}$ is independently a hydrogen atom or an alkyl group having 1 to 4 carbon atoms, and each of p and q is an integer of 0 to 2, diamine of the formula (b)-17,

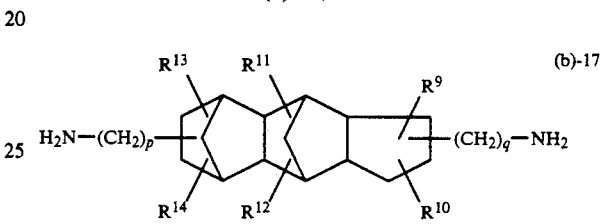
(b)-17 wherein R$^9$ to R$^{12}$, p and q are as defined above, and each of R$^{13}$ and R$^{14}$ has the same meaning as that of R$^9$ and R$^{12}$; diamine of the formula (b)-18,

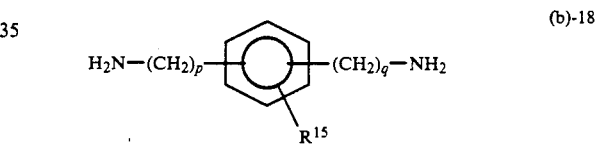
(b)-18 wherein p and q are as defined above, and R15 is a hydrogen atom or an alkyl group having 1 to 4 carbon atoms; diamine of the formula (b)-19,

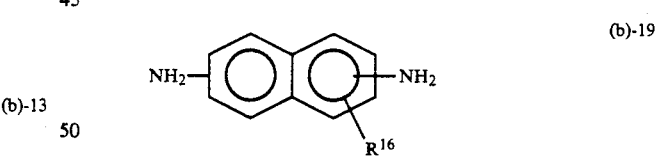
(b)-19 wherein R$^{16}$ is a hydrogen atom or an alkyl group having 1 to 4 carbon atoms, diamine of the formula (b)-20,

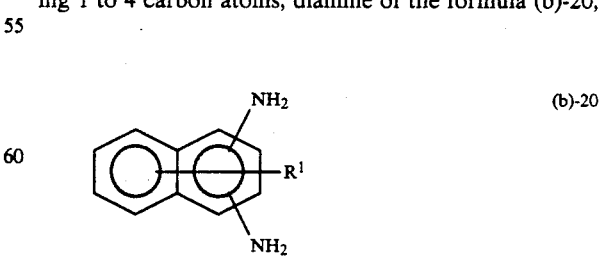
(b)-20 wherein R$^{17}$ is a hydrogen atom or an alkyl group having 1 to 4 carbon atoms; and diamine of the formula (b)-21,

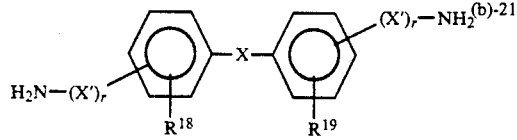
wherein X is a single bond, or X represents one of —CO—, —SO$_2$—, —S—, —O—, —C(CH$_2$)$_2$—, —NH-CONH— or CONH—, each r independently represents 0 or 1 and each X' independently, represents a divalent alkylene group having 1 to 4 carbon atoms, and R$^{18}$ and R$^{19}$, independently, represent a hydrogen atom or an alkyl group having 1 to 4 carbon atom.
* * * * *